(12) United States Patent
Van Deest et al.

(10) Patent No.: US 12,377,469 B2
(45) Date of Patent: Aug. 5, 2025

(54) RECOATER FOR ADDITIVE MANUFACTURING

(71) Applicant: General Electric Company, Schenectady, NY (US)

(72) Inventors: Ryan William Van Deest, Liberty Township, OH (US); David Scott Simmermon, Felicity, OH (US); Nicholas Ryan Dodds, Cincinnati, OH (US); Mohammed Mounir Shalaby, Mason, OH (US)

(73) Assignee: General Electric Company, Evendale, OH (US)

( * ) Notice: Subject to any disclaimer, the term of this patent is extended or adjusted under 35 U.S.C. 154(b) by 784 days.

(21) Appl. No.: 17/189,959

(22) Filed: Mar. 2, 2021

(65) Prior Publication Data

US 2022/0281011 A1    Sep. 8, 2022

(51) Int. Cl.

| | |
|---|---|
| *B22F 12/67* | (2021.01) |
| *B22F 10/50* | (2021.01) |
| *B22F 10/85* | (2021.01) |
| *B29C 64/214* | (2017.01) |
| *B29C 64/393* | (2017.01) |
| *B33Y 10/00* | (2015.01) |

(Continued)

(52) U.S. Cl.
CPC .............. *B22F 12/67* (2021.01); *B22F 10/50* (2021.01); *B22F 10/85* (2021.01); *B29C 64/214* (2017.08); *B29C 64/393* (2017.08); *B33Y 10/00* (2014.12); *B33Y 30/00* (2014.12); *B33Y 40/00* (2014.12); *B33Y 50/02* (2014.12)

(58) Field of Classification Search
CPC ..... B29C 64/214; B29C 64/393; B22F 10/50; B22F 10/85; B22F 12/67; B33Y 10/00; B33Y 30/00; B33Y 40/00; B33Y 50/00; B33Y 60/02
See application file for complete search history.

(56) References Cited

U.S. PATENT DOCUMENTS

| | | |
|---|---|---|
| 2,722,867 A | 11/1955 | Dackor et al. |
| 3,567,120 A | 3/1971 | Suda et al. |

(Continued)

FOREIGN PATENT DOCUMENTS

| | | |
|---|---|---|
| CN | 206573076 U | 10/2017 |
| DE | 19649865 C1 | 2/1998 |

(Continued)

OTHER PUBLICATIONS

Gu et al., Influences of Energy Density on Porosity and Microstructure of Selective Laser Melted 17-4PH Stainless Steel. 24th International SFF Symposium—An Additive Manufacturing Conference, Aug. 16, 2013, pp. 474-489.

(Continued)

*Primary Examiner* — Galen H Hauth
(74) *Attorney, Agent, or Firm* — Dority & Manning, P.A.

(57) ABSTRACT

A recoater for an additive manufacturing apparatus includes a recoater arm and retainer operably coupled with the recoater arm. The retainer includes a housing defining a cavity. A blade carrier supports one or more blades. An actuator is operably coupled with the housing and is configured to compressively retain an upper portion of the blade carrier within the cavity between a slide of the actuator and the housing.

17 Claims, 16 Drawing Sheets

(51) Int. Cl.
  *B33Y 30/00* (2015.01)
  *B33Y 40/00* (2020.01)
  *B33Y 50/02* (2015.01)

(56) References Cited

U.S. PATENT DOCUMENTS

| | | | |
|---|---|---|---|
| 4,863,538 | A | 9/1989 | Deckard |
| 5,059,021 | A | 10/1991 | Spence et al. |
| 5,123,734 | A | 6/1992 | Spence et al. |
| 5,174,931 | A | 12/1992 | Almquist et al. |
| 5,415,384 | A | 5/1995 | Obrist et al. |
| 5,460,758 | A | 10/1995 | Langer et al. |
| 5,702,574 | A | 12/1997 | Foster et al. |
| 5,810,344 | A | 9/1998 | Nishimoto |
| 5,879,753 | A | 3/1999 | Zajchowski et al. |
| 5,902,537 | A | 5/1999 | Almquist et al. |
| 5,913,555 | A | 6/1999 | Richter et al. |
| 5,943,235 | A | 8/1999 | Earl et al. |
| 6,161,826 | A | 12/2000 | Forrer |
| 6,401,000 | B1 | 6/2002 | Suzuki et al. |
| 6,435,596 | B1 | 8/2002 | Phillips |
| 6,449,529 | B1 | 9/2002 | Oleksy |
| 6,492,651 | B2 | 12/2002 | Kerekes |
| 6,532,656 | B1 | 3/2003 | Wilkins et al. |
| 6,607,689 | B1 | 8/2003 | Farnworth |
| 6,641,128 | B2 | 11/2003 | Fries |
| 6,895,350 | B2 | 5/2005 | Suzuki et al. |
| 6,908,288 | B2 | 6/2005 | Jackson et al. |
| 6,986,654 | B2 | 1/2006 | Imiolek et al. |
| 6,993,818 | B2 | 2/2006 | Smith et al. |
| 7,009,137 | B2 | 3/2006 | Guo |
| 7,034,246 | B2 | 4/2006 | Muylaert et al. |
| 7,261,550 | B2 | 8/2007 | Herzog |
| 7,357,629 | B2 | 4/2008 | Weiskopf et al. |
| 7,449,658 | B2 | 11/2008 | Mielke |
| 7,520,495 | B2 | 4/2009 | Stark |
| 7,520,740 | B2 | 4/2009 | Walstrom et al. |
| 7,585,450 | B2 | 9/2009 | Wahlstrom et al. |
| 7,587,818 | B2 | 9/2009 | Gorman et al. |
| 7,665,717 | B2 | 2/2010 | Lenzini |
| 7,674,107 | B2 | 3/2010 | Perret et al. |
| 7,690,909 | B2 | 4/2010 | Wahlstrom |
| 7,713,454 | B2 | 5/2010 | Larsson |
| 7,790,096 | B2 | 9/2010 | Merot et al. |
| 7,850,885 | B2 | 12/2010 | Philippi et al. |
| 8,021,138 | B2 | 9/2011 | Green |
| 8,056,606 | B2 | 11/2011 | Hasz |
| 8,083,513 | B2 | 12/2011 | Montero-Escuder et al. |
| 8,105,527 | B2 | 1/2012 | Wahlstrom |
| 8,153,183 | B2 | 4/2012 | Skubic et al. |
| 8,366,432 | B2 | 2/2013 | Perret et al. |
| 8,801,502 | B2 | 8/2014 | Ng et al. |
| 8,875,392 | B2 | 11/2014 | Richter |
| 8,920,063 | B1 | 12/2014 | Easley |
| 8,996,156 | B2 | 3/2015 | Melzer-Jokisch et al. |
| 9,034,236 | B2 | 5/2015 | Xu et al. |
| 9,073,156 | B2 | 7/2015 | Clark et al. |
| 9,114,478 | B2 | 8/2015 | Scott et al. |
| 9,216,484 | B2 | 12/2015 | Bishop et al. |
| 9,254,535 | B2 | 2/2016 | Buller et al. |
| 9,283,593 | B2 | 3/2016 | Bruck et al. |
| 9,289,861 | B2 | 3/2016 | Czerner |
| 9,302,359 | B2 | 4/2016 | Hediger |
| 9,346,127 | B2 | 6/2016 | Buller et al. |
| 9,435,211 | B2 | 9/2016 | Xu |
| 9,452,474 | B2 | 9/2016 | Xu |
| 9,555,522 | B2 | 1/2017 | Evans et al. |
| 9,884,393 | B2 | 2/2018 | Roberts et al. |
| 9,919,474 | B2 | 3/2018 | Napadensky |
| 9,943,933 | B2 | 4/2018 | Zu et al. |
| 10,035,223 | B2 | 7/2018 | Ladewig et al. |
| 10,086,481 | B2 | 10/2018 | Krol et al. |
| 10,646,924 | B2 | 5/2020 | Spears et al. |
| 11,312,072 | B2 | 4/2022 | Deforge et al. |
| 2002/0104973 | A1 | 8/2002 | Kerekes |
| 2003/0214571 | A1 | 11/2003 | Ishikawa et al. |
| 2004/0094728 | A1 | 6/2004 | Herzog et al. |
| 2004/0170765 | A1 | 9/2004 | Ederer et al. |
| 2004/0191064 | A1 | 9/2004 | Guo |
| 2005/0001356 | A1 | 1/2005 | Tochimoto et al. |
| 2006/0219163 | A1 | 10/2006 | Merot et al. |
| 2007/0003416 | A1 | 1/2007 | Bewlay et al. |
| 2007/0075461 | A1 | 4/2007 | Hunter et al. |
| 2009/0206522 | A1 | 8/2009 | Hein et al. |
| 2010/0028158 | A1 | 2/2010 | Richter |
| 2011/0223349 | A1 | 9/2011 | Scott |
| 2011/0278773 | A1 | 11/2011 | Bokodi et al. |
| 2012/0076578 | A1 | 3/2012 | Schron, Sr. et al. |
| 2012/0085875 | A1 | 4/2012 | Hoyt et al. |
| 2013/0101746 | A1 | 4/2013 | Keremes et al. |
| 2014/0023426 | A1 | 1/2014 | Schron, Sr. et al. |
| 2014/0077422 | A1 | 3/2014 | Minick |
| 2014/0163717 | A1 | 6/2014 | Das et al. |
| 2014/0259668 | A1 | 9/2014 | Henderson et al. |
| 2014/0346969 | A1 | 11/2014 | Scott |
| 2014/0377117 | A1 | 12/2014 | Herrmann et al. |
| 2015/0079306 | A1 | 3/2015 | Schoeneborn et al. |
| 2015/0165556 | A1 | 6/2015 | Jones et al. |
| 2015/0209889 | A1 | 7/2015 | Peters et al. |
| 2015/0224607 | A1 | 8/2015 | Bruck et al. |
| 2015/0298259 | A1 | 10/2015 | Colin et al. |
| 2015/0336271 | A1 | 11/2015 | Spicer et al. |
| 2015/0367415 | A1 | 12/2015 | Buller et al. |
| 2016/0023403 | A1 | 1/2016 | Ramos et al. |
| 2016/0069184 | A1 | 3/2016 | Ribic et al. |
| 2016/0074965 | A1 | 3/2016 | Jakimov et al. |
| 2016/0121399 | A1 | 6/2016 | Buller et al. |
| 2016/0159011 | A1 | 6/2016 | Marchione et al. |
| 2016/0167172 | A1 | 6/2016 | Goncharov et al. |
| 2016/0305777 | A1 | 10/2016 | Racine et al. |
| 2016/0318257 | A1 | 11/2016 | Brooks et al. |
| 2017/0009584 | A1 | 1/2017 | Cui et al. |
| 2017/0056975 | A1 | 3/2017 | Carter et al. |
| 2017/0106482 | A1 | 4/2017 | Roberts et al. |
| 2017/0143145 | A1 | 5/2017 | Peynet |
| 2017/0165922 | A1 | 6/2017 | Hakkaku |
| 2018/0038385 | A1 | 2/2018 | Welch |
| 2018/0056393 | A1 | 3/2018 | Herzog et al. |
| 2018/0079033 | A1 | 3/2018 | Krueger et al. |
| 2018/0111319 | A1 | 4/2018 | Brezoczky et al. |
| 2018/0200964 | A1 | 7/2018 | Rockstroh et al. |
| 2018/0207875 | A1 | 7/2018 | Menchik |
| 2018/0236504 | A1 | 8/2018 | Pourcher et al. |
| 2018/0236556 | A1 | 8/2018 | Garay et al. |
| 2018/0238172 | A1 | 8/2018 | Garay et al. |
| 2018/0238173 | A1 | 8/2018 | Garay et al. |
| 2018/0243866 | A1 | 8/2018 | Srinivasan et al. |
| 2019/0022790 | A1* | 1/2019 | Hofmann ............. B29C 64/264 |
| 2019/0118301 | A1 | 4/2019 | Winiarski et al. |
| 2019/0152140 | A1* | 5/2019 | Childers ............... B29C 64/264 |
| 2019/0275586 | A1 | 9/2019 | Dering et al. |
| 2019/0329497 | A1 | 10/2019 | Deak |
| 2020/0376761 | A1 | 12/2020 | Sweetland |

FOREIGN PATENT DOCUMENTS

| | | | | |
|---|---|---|---|---|
| DE | 29907262 U1 | | 7/1999 | |
| DE | 102004018770 A1 | | 11/2005 | |
| DE | 102011102543 A1 | | 11/2012 | |
| DE | 102010001414 B4 | | 5/2013 | |
| DE | 102012011217 A1 | | 12/2013 | |
| EP | 1637274 A1 | | 3/2006 | |
| EP | 2191922 A1 | | 6/2010 | |
| EP | 2202016 A1 | | 6/2010 | |
| EP | 2202016 B1 | | 4/2012 | |
| EP | 3205483 A1 | | 8/2017 | |
| EP | 3473440 A1 | * | 4/2019 | ............. B22F 10/20 |
| EP | 3536484 A1 | * | 9/2019 | ............. B22F 10/20 |
| EP | 3568247 A1 | | 11/2019 | |
| FR | 3058354 A1 | | 5/2018 | |
| GB | 2181374 A | | 4/1987 | |
| GB | 2449862 A | * | 12/2008 | ............... B22F 5/04 |
| GB | 2453945 A | | 4/2009 | |
| WO | WO2014/199149 A1 | | 12/2014 | |

(56) References Cited

FOREIGN PATENT DOCUMENTS

| WO | WO2015/103476 A1 | 7/2015 |
| WO | WO2015/118180 A1 | 8/2015 |
| WO | WO2015/141779 A1 | 9/2015 |
| WO | WO2016/176432 A1 | 11/2016 |
| WO | WO2017/074373 A1 | 5/2017 |
| WO | WO2017/143145 A1 | 8/2017 |
| WO | WO2018/132204 A1 | 7/2018 |
| WO | WO2018/145912 A1 | 8/2018 |

OTHER PUBLICATIONS

Jones et al., Remanufacture of turbine blades by laser cladding, machining and in-process scanning in a single machine, Proceedings from $23^{rd}$ Annual International Solid Freeform Fabrication Symposium, Aug. 16, 2012, pp. 821-827.

Liu et al., Effects of melt-pool geometry on crystal growth and microstructure development in laser surface-melted superalloy single crystals, Mathematical modeling of single-crystal growth in a melt pool (Part 1), Science Direct, Acta Materialia, vol. 52, 2004, pp. 4833-4847.

Mitee-Bite Products, LLC, Workholding Specialists, Aug. 2017 Catalog, 52 Pages.

Peng et al., Influence of Energy Density on Energy Demand and Porosity of 316L Stainless Steel Fabricated by Selective Laser Melting, International Journal of Precision Engineering and Manufacturing-Green Technology, vol. 5, No. 1, Jan. 2018, pp. 5562.

Wong et al., A Review of Additive Manufacturing, International Scholarly Research Network, Mechanical Engineering, Article ID 208760, vol. 2012, May 2012, 11 Pages.

\* cited by examiner

US 12,377,469 B2

RECOATER FOR ADDITIVE MANUFACTURING

FIELD

The present subject matter relates generally to an additive manufacturing apparatus, and more particularly to a recoater for the additive manufacturing apparatus.

BACKGROUND

An additive manufacturing process may involve manufacturing three-dimensional (3D) objects through fusion of powder materials in two-dimensional (2D) layers on a layer-by-layer basis. Generally, layers of powder materials are successively laid down to form powder beds and irradiated with an energy source so that particles of the powder materials within each layer are sequentially fused to form a solidified cross-section of the desired 3D object. While some available additive manufacturing technologies directly deposit the powder material, others use a spreading or recoating process to form consecutive layers that can then be selectively fused in order to create the solidified cross-section of the desired 3D object. For example, during direct metal laser sintering (DMLS) or direct metal laser melting (DMLM), an apparatus builds objects in a layer-by-layer manner by sintering or melting a powder material using an energy beam.

The powder material to be melted by the energy beam is spread evenly over a powder bed on a build platform, and the energy beam sinters or melts a cross sectional layer of the object being built under control of an irradiation emission directing device. Each time the powder material is deposited, a recoater or a distribution assembly may be used to form a layer of the powder material. However, various issues may be experienced by the recoater. For example, the recoater is normally set at a desired height by hand that may be slightly varied each time the recoater is adjusted and/or replaced. Also, in the event that a portion of the recoater is broken during a manufacturing process, the process must be suspended until a new recoater can be installed at a generally common height. As such, it would be beneficial to have a recoater having one or more blades that may be set at a desired height and/or changed with minimal to no human interaction.

BRIEF DESCRIPTION

Aspects and advantages of the invention will be set forth in part in the following description, or may be obvious from the description, or may be learned through practice of the invention.

In some embodiments of the present disclosure, a recoater for an additive manufacturing apparatus includes a recoater arm. A retainer is operably coupled with the recoater arm. The retainer includes a housing defining a cavity. A blade carrier supports one or more blades. A first actuator is operably coupled with the housing and is configured to compressively retain an upper portion of the blade carrier within the cavity between a first slide of the first actuator and the housing.

In some embodiments of the present disclosure, an additive manufacturing apparatus includes a build plate configured to support an object. The build plate is positioned within a build envelope. A base is positioned externally of the build envelope. A build unit includes an energy device and a recoater. A distribution assembly is operably coupled with the recoater. The distribution assembly includes a retainer having a housing that defines a cavity. A blade carrier supports one or more blades. An actuator selectively retains the blade carrier within the cavity. A positioning system is operably coupled with the recoater and configured to move the recoater between the build envelope and the base. The actuator is configured to release the blade carrier when the blade carrier is disposed externally from the build envelope.

In some embodiments of the present disclosure, a method of operating an additive manufacturing apparatus that includes a recoater is provided. The method includes positioning a retainer of a recoater over a first blade carrier positioned within the additive manufacturing apparatus. The method also includes moving a slide of an actuator coupled with a retainer between a released position and an extended position to retain the first blade carrier at least partially within the retainer. Further, the method includes positioning one or more blades of the first blade carrier along a leveling surface. In addition, the method includes moving the actuator from the extended position to disengage the first blade carrier from the retainer. The method also includes positioning the retainer a predefined distance above the leveling surface. Lastly, the method includes moving the slide of the actuator to the extended position to compressively retain the first blade carrier within the retainer; and distributing a first powder bed of a powder material within a build envelope. These and other features, aspects, and advantages of the present disclosure will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present disclosure, including the best mode thereof, directed to one of ordinary skill in the art, is set forth in the specification, which makes reference to the appended figures.

Figure 1:
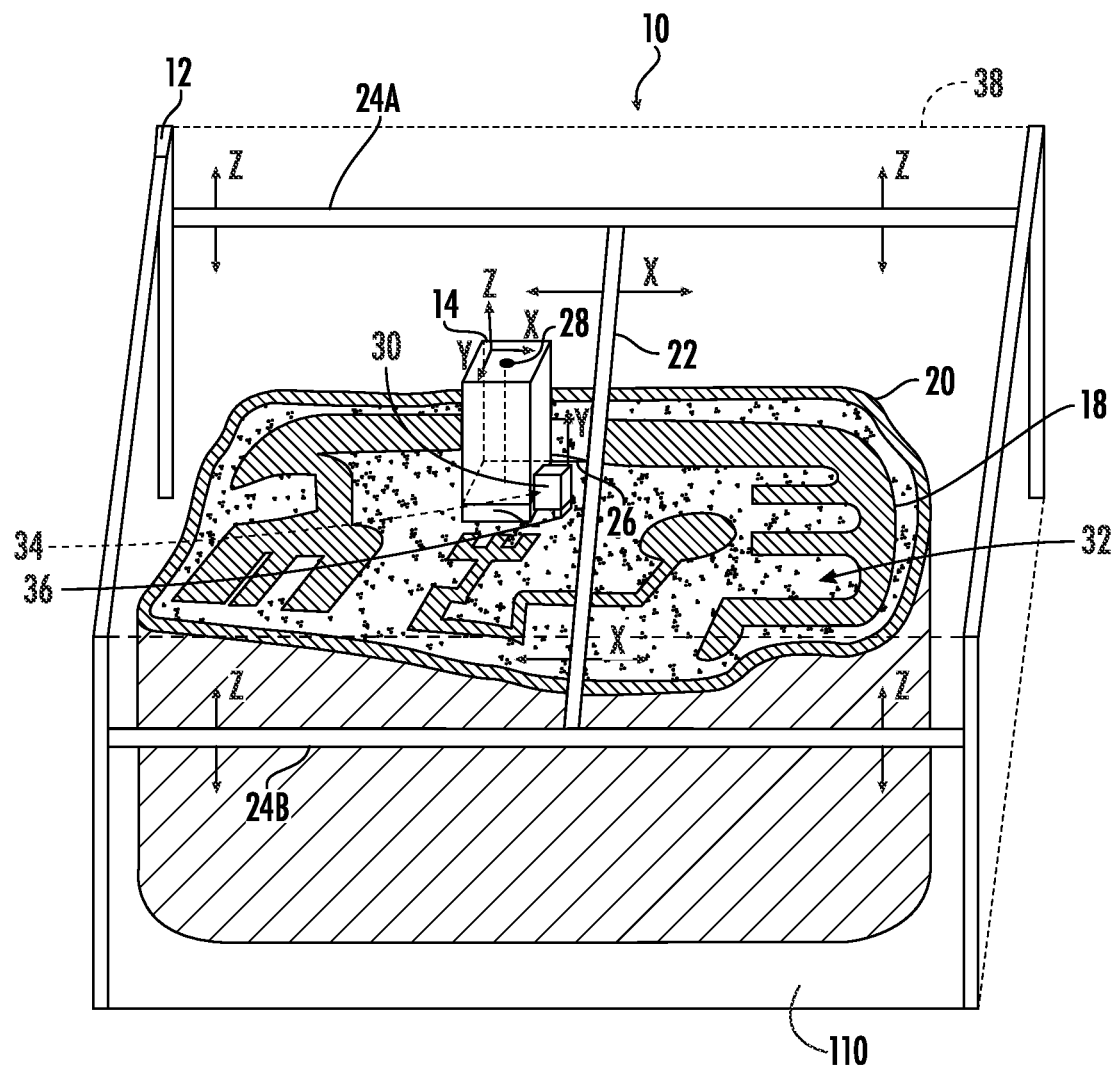
FIG. 1 is a front schematic view of a large-scale additive manufacturing apparatus in accordance with various aspects of the present disclosure.

Repeat use of reference characters in the present specification and drawings is intended to represent the same or analogous features or elements of the present disclosure.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first," "second," and "third" may be used interchangeably to distinguish one component from another and are not intended to signify location or importance of the individual components. The terms "coupled," "fixed," "attached to," and the like refer to both direct coupling, fixing, or attaching, as well as indirect coupling, fixing, or attaching through one or more intermediate components or features, unless otherwise specified herein.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," "generally," and "substantially," is not to be limited to the precise value specified. In at least some instances, the approximating language may correspond to the precision of an instrument for measuring the value, or the precision of the methods or apparatus for constructing or manufacturing the components and/or systems. For example, the approximating language may refer to being within a ten percent margin.

Moreover, the technology of the present application will be described with relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein should be considered exemplary.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

As used herein, the term "and/or," when used in a list of two or more items, means that any one of the listed items can be employed by itself, or any combination of two or more of the listed items can be employed. For example, if a composition or assembly is described as containing components A, B, and/or C, the composition or assembly can contain A alone; B alone; C alone; A and B in combination; A and C in combination; B and C in combination; or A, B, and C in combination.

The present disclosure is generally directed to an additive manufacturing apparatus that implements various manufacturing processes such that successive layers of material(s) are provided on each other to "build-up," layer-by-layer, a three-dimensional component. The successive layers generally cure together to form a monolithic object which may have a variety of integral sub-components. Although additive manufacturing technology is described herein as enabling fabrication of complex objects by building objects point-by-point, layer-by-layer, typically in a vertical direction, variations of the described additive manufacturing apparatus and technology are possible and within the scope of the present subject matter. In some embodiments, the material layers are fused (for example, sintered or melted) together using a focused energy such as a laser beam. The additive manufacturing apparatus and processes include, for example, and without limitation, vat photopolymerization, powder bed fusion, binder jetting, material jetting, sheet lamination, material extrusion, directed energy deposition and hybrid systems. These apparatus and processes may include, for example, and without limitation, stereolithography, digital light processing, scan, spin, and selectively photocure, continuous liquid interface production, selective laser sintering, direct metal laser sintering, direct metal laser melting, selective laser melting, electron beam melting, selective heat sintering, multi jet fusion, smooth curvatures printing, multi jet modeling, laminated object manufacture, selective deposition lamination, ultrasonic additive manufacturing, fused filament fabrication, fused deposition modeling, laser metal deposition, laser engineered net shaping, direct metal deposition, hybrid systems, and combinations of these methods and systems. These processes and corresponding apparatus may employ, for example, and without limitation, all forms of electromagnetic radiation, heating, sintering, melting, curing, binding, consolidating, pressing, embedding, or combinations thereof.

In some instances, the additive manufacturing apparatus may use a spreading or recoating process to form consecutive powder beds of a powder material that can then be selectively fused in order to create the solidified cross-section of the desired 3D object. Each time the powder material is deposited, a recoater or a distribution assembly may be used to form a powder bed of the powder material. However, commercially available recoaters can be inconsistent. As such, the recoater of the present disclosure includes a distribution assembly having a retainer that defines a cavity, a blade carrier supporting one or more blades, and an actuator selectively retaining the blade carrier within the cavity that can more consistently distribute a powder bed within an additive manufacturing apparatus.

In some embodiments, a positioning system is operably coupled with the recoater and is configured to move the recoater between a build envelope and a base. In various embodiments, the positioning system may be configured as a gantry style motion system that provides omni-directional movement of the recoater. In some instances, the actuator is configured to release the blade carrier when the blade carrier is disposed externally from the build envelope to level the blade carrier and/or change the blade carrier with or without operator intervention.

To level the blade carrier, in various instances, the positioning system may position the retainer and the blade carrier over a leveling surface of the base, which may be generally parallel with the build platform of the additive manufacturing apparatus. When on the leveling surface, the slide of the actuator may be released thereby releasing the blade carrier from the retainer allowing the one or more blades of the blade carrier to rest on the leveling surface while utilizing gravity and the weight of the blade carrier to sit level with the leveling surface. Once the one or more blades are positioned in a generally parallel orientation to the build platform, the slide of the actuator may be returned to the extended position thereby locking an orientation of the blade relative to the retainer.

In some instances, the recoater and/or the additive manufacturing apparatus may include a position sensor that is configured to store a defined location of the retainer relative to the blade carrier and/or the base such that the actuator may engage the blade carrier each time the retainer returns to the defined location thereby increasing the consistency of the recoater.

In some instances, a verification sensor may also be operably coupled with the base. The verification sensor may be configured to detect damage to one or more blades of the blade carrier. In various embodiments, the verification sensor can be utilized when a new blade carrier is coupled with the recoater and/or periodically during a build process.

The recoater described herein provides many advantages over current recoaters. For example, the recoater of the present disclosure allows for changing of recoater blades with or without human intervention during a build process. In addition, the one or more blades of the recoater may be leveled with greater precision and/or releveled during a build process to increase build quality. Further, the verification sensor of the current disclosure may detect damage to the one or more blades of the recoater prior to the damaged blade negatively impacting the build process. Each of these benefits can increase build quality, reduce build times, and/or reduce the cost of forming an object through an additive manufacturing process.

Referring to the drawings wherein identical reference numerals denote the similar elements throughout the various views, FIG. 1 illustrates an example of a large-scale additive manufacturing apparatus 10 according to various embodiments of the present disclosure. The apparatus 10 can include a build unit positioning system 12, a build unit 14, and a build plate 16 (FIG. 2) beneath an object 18 being built. The maximum build area is defined by the build unit positioning system 12 and the build area for a particular build can be confined to a build envelope 20 that may be built up along with the object 18.

In various embodiments, the build unit 14 may include an energy source 28 and a recoater 30. In various embodiments, the energy source 28 and the recoater 30 may be incorporated into a common module and/or the build unit 14 may include more than one module.

The radiant energy device 28 may be configured as any device or combination of devices operable to generate and project radiant energy on various portions of a powder bed 60 in a suitable pattern and with a suitable energy level and other operating characteristics to cure the build material during the build process. In various embodiments, the radiant energy device 28 may be configured as any practicable device or any practicable combination of devices, including, but not limited to, electron beam gun, a heat lamp, an electricity-based device, a laser, and/or the like.

In some embodiments, the radiant energy device 28 includes a laser source for generating a laser beam. In some embodiments, the laser source includes a pulsed laser source that generates a pulsed laser beam. The pulsed laser beam does not emit laser radiation continuously in contrast with a continuous laser radiation, but emits the laser in a pulsed manner i.e., in time limited pulses with intervals between the laser pulses. In some embodiments, a plurality of radiant energy devices 28 is configured to selectively irradiate focused energies (e.g., laser beams) onto a disposed powder material 32 disposed on the object 18 and/or the build plate 16.

Figure 3:
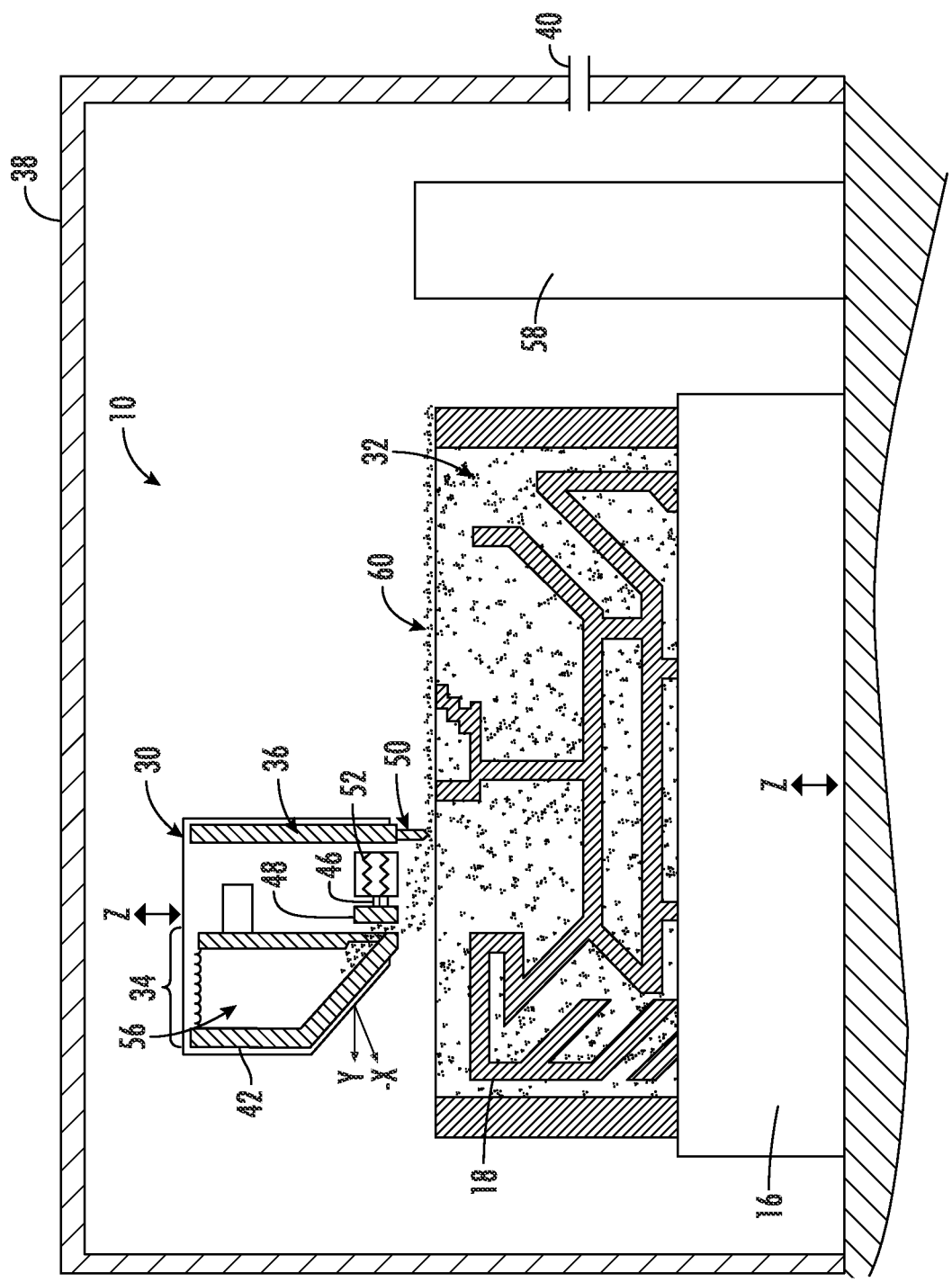
FIG. 3 is a schematic side view of the build unit dispensing powder in accordance with various aspects of the present disclosure.

The recoater 30 may include a powder delivery system 34 to dispose a powder material 32. The disposed powder material 32 on the object 18 and/or the build plate 16 may form a powder bed 60 (FIG. 3). The powder material 32 (to be processed to form an object 18) may include, but is not limited to, a polymer, plastic, metal, ceramic, sand, glass, wax, fiber, biological matter, a composite, or combinations thereof. In some embodiments, the powder material 32 can be a metallic material, non-limiting examples of which include aluminum and its alloys, titanium and its alloys, nickel and its alloys, stainless steels, cobalt-chrome alloys, tantalum, and niobium. These powder materials 32 may have particles of a variety of forms, shapes, and sizes as appropriate for a given material and process. The powder material 32 may include, for example without limitation, particles, filaments, atomized particles, and combinations thereof.

The recoater 30 further includes a distribution assembly 36 that is movable above the object 18 and/or the build plate 16 and is configured to distribute the powder material 32 disposed on the object 18 and/or the build plate 16 to form a layer of the powder material 32, which may have a generally consistent thickness. To form the powder bed 60 of a generally consistent thickness, the distribution assembly 36 is movable above the build plate 16 in a plane parallel to the object 18 and/or the build plate 16.

While manufacturing an object 18 using the additive manufacturing apparatus 10, after a powder bed 60 of the powder material 32 has been processed as a result of being irradiated by a focused energy directed by the radiant energy device 28, at least a portion of the build plate 16 may be moved, for example, lowered within the chamber. Thereafter, additional powder material 32 may be delivered to deposit another powder bed 60 of the powder material 32 onto the previous powder bed 60. Each time a quantity of the powder material 32 is dispensed from the recoater 30, the distribution assembly 36 may be used to form a powder bed 60 of the disposed powder material 32, which may be of a generally consistent thickness. The disposed powder bed 60 of the powder material 32 can then be irradiated using the focused energy directed by the radiant energy device 28 to fuse the powder material 32 and form a solidified powder bed 60.

The build unit positioning system 12 may be configured as a gantry having an X crossbeam 22 that moves the build unit 14 in the X direction. The gantry may further include one or more Z crossbeams 24A and 24B that move the build unit 14 and the X crossbeam 22 in the Z-direction. The X cross beam 304 and the build unit 14 are attached by a mechanism 26 that moves the build unit 14 in the Y direction. It will be appreciated that the build unit positioning system 12, while illustrated in FIG. 1 as a gantry, is not limited to using a gantry. In general, the positioning system used in the present disclosure may be any multidimensional positioning system such as a delta robot, cable robot, robot arm, etc.

Figure 16:
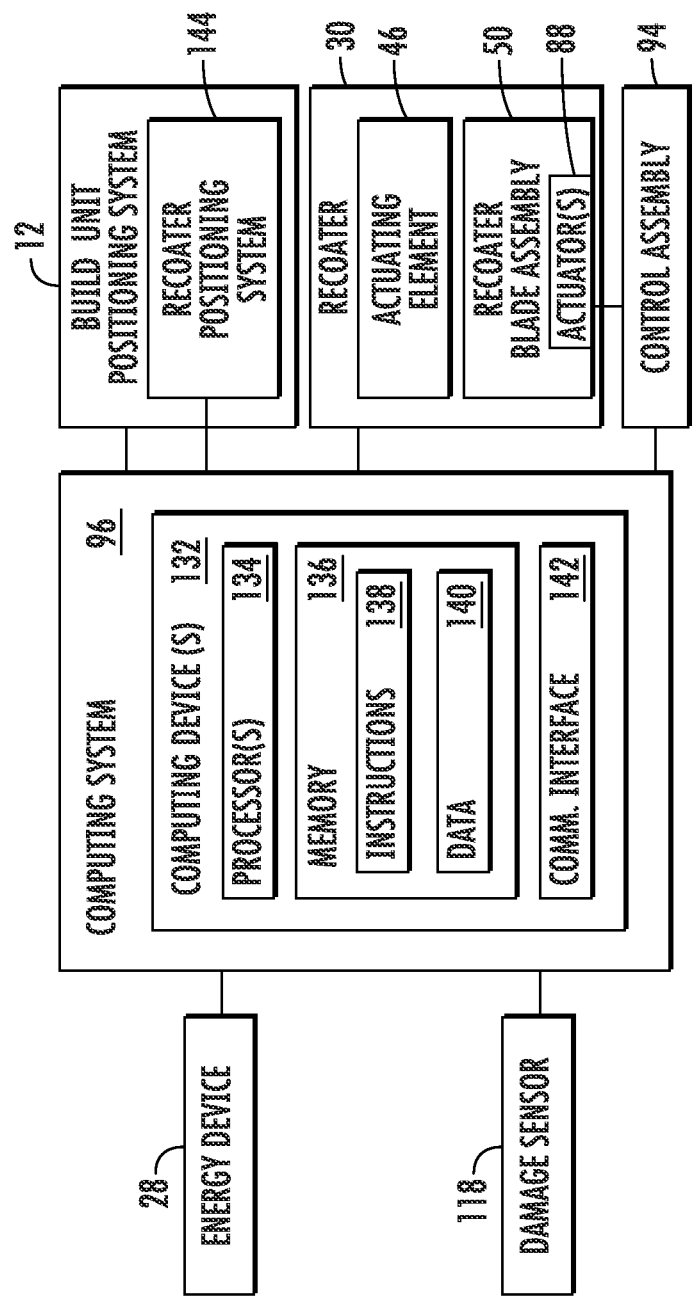
FIG. 16 depicts an exemplary controller for an additive manufacturing apparatus in accordance with various aspects of the present disclosure.

In instances in which the build unit 14 includes more than one module, each module may include a respective positioning system within the build unit positioning system 12. For example, the build unit positioning system 12 may include an energy source positioning system and/or a recoater positioning system 144 (FIG. 16). Each of the energy source positioning system and/or the recoater positioning system 144 may be configured as a gantry that moves the respective energy source 28 and/or recoater 30. It will be appreciated that the energy source positioning system and/or the recoater positioning system 144 is not limited to using a gantry. In general, the energy source positioning system and/or the recoater positioning system 144 used in the present disclosure may be any multidimensional positioning system such as a delta robot, cable robot, robot arm, etc.

Figure 2:
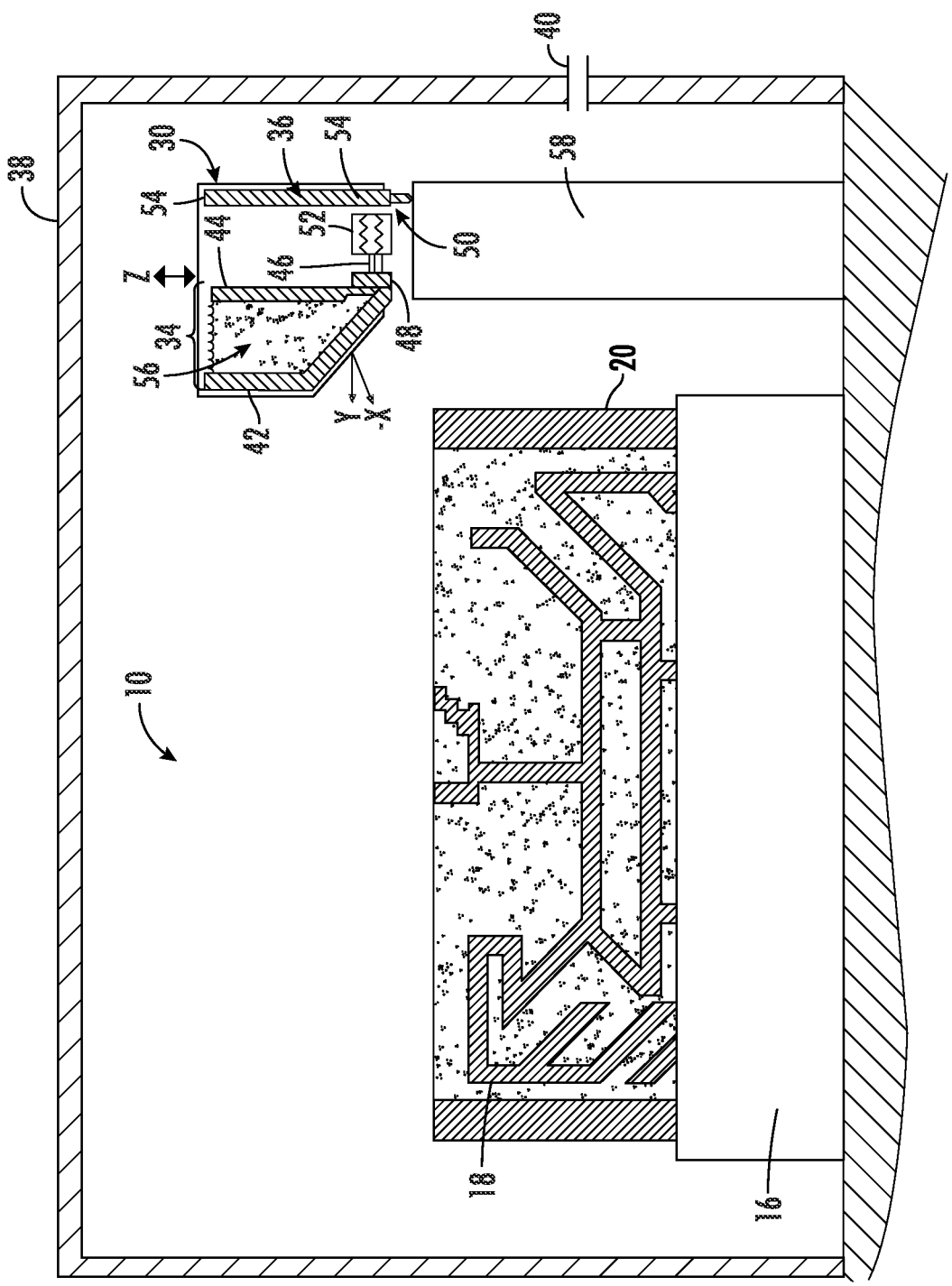
FIG. 2 is a schematic side view of a build unit in accordance with various aspects of the present disclosure.

FIGS. 2 and 3 illustrate schematic views of a recoater 30 according to various embodiments of the present disclosure. In the illustrated embodiments, the recoater 30 has a hopper 56 including a back plate 42 and a front plate 44. The recoater 30 also has at least one actuating element 46, at least one gate plate 48, a recoater distribution assembly 36, an actuator 52, and a recoater arm 54.

Optionally, the components of the apparatus 10 may be surrounded by a housing 38, which may be used to provide a shielding or inert gas (e.g., a "process gas") atmosphere using gas ports 40. Optionally, pressure within the housing 38 could be maintained at a desired level greater than or less than atmospheric. Optionally, the housing 38 could be temperature and/or humidity controlled. Optionally, ventilation of the housing 38 could be controlled based on factors such as a time interval, temperature, humidity, and/or chemical species concentration. In some embodiments, the housing 38 can be maintained at a pressure that is different than an atmospheric pressure.

FIGS. 2 and 3 also show a build envelope 20 that may be built by, for example, additive manufacturing or Mig/Tig welding, an object 18 being formed, and powder 416 contained in the hopper 56 used to form the object 18. In the illustrated embodiment, the actuator 52 activates the actuating element 46 to pull the gate plate 48 away from the front plate 44. In some embodiments, the actuator 52 may be, for example, a pneumatic actuator, and the actuating element 46 may be a bidirectional valve. Additionally or alternatively, the actuator 52 may be, for example, a voice coil, and the actuating element 46 may be a spring.

In some instances, when not in use, the recoater 30 may be positioned on and/or over a base 58, which may be external to the build envelope 20 along a Y-direction. The base 58 may be configured to support and/or relevel the recoater distribution assembly 36 prior to the distribution assembly 36 being used to distribute a powder bed 60 of the disposed powder material 32. As will be described in greater detail below, when positioned externally of the build envelope 20, a blade carrier 62 having one or more blades 64 may be released from a retainer 66. When the one or more blades 64 are to be used to distribute the powder bed 60, the blade carrier 62 may be reengaged in a predefined relationship relative to the retainer 66 to allow for leveling of the one or more blades 64 and/or changing of the one or more blades 64 prior to use.

FIG. 3 shows the recoater 30 of FIG. 2, with the gate plate 48 in the open position (as shown by element 510) and actuating element 46. When the gate plate 48 is in the open position, powder in the hopper is deposited to make fresh powder bed 60, which is smoothed over by the recoater distribution assembly 36 to make a powder bed 60 having a generally consistent thickness. In some embodiments, generally consistent thickness may be irradiated at the same time that the build unit 14 is moving, which would allow for continuous operation of the build unit 14 and thus faster production of the object 18.

Figure 4:
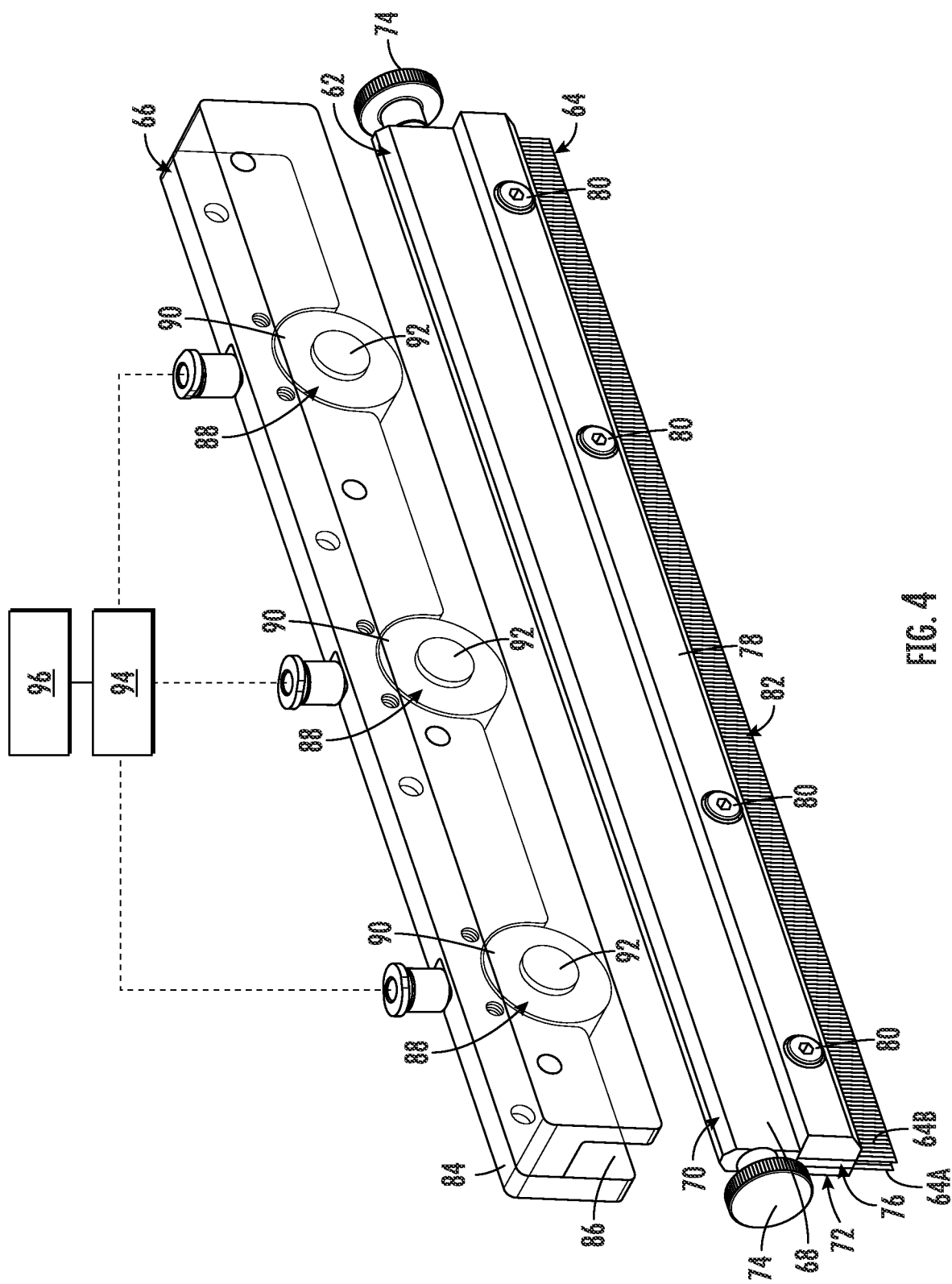
FIG. 4 is a rear exploded view of a distribution assembly of the build unit having a blade carrier supporting one or more blades and a retainer in accordance with various aspects of the present disclosure.
Figure 5:
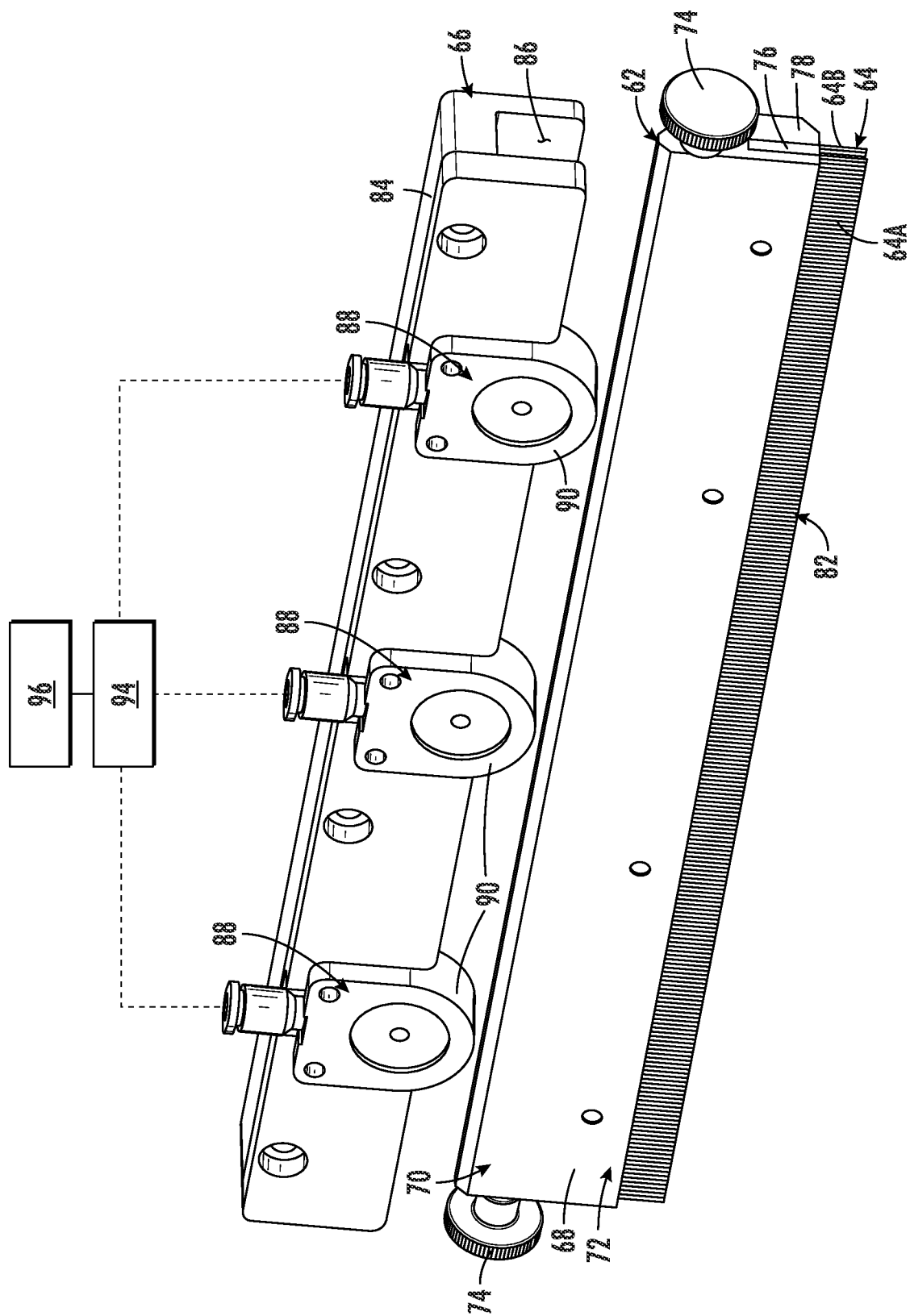
FIG. 5 is a front exploded view of the blade carrier supporting the one or more blades and the retainer in accordance with various aspects of the present disclosure.

Referring now to FIGS. 4 and 5, front and rear views of the recoater distribution assembly 36 are respectively illustrated according to various exemplary embodiments of the present disclosure. As illustrated, the recoater distribution assembly 36 includes a recoater retainer 66, which may be integrated into and/or operably coupled with the recoater arm 54 (FIG. 2) and a blade carrier 62, which may be operably coupled with the recoater retainer 66.

The blade carrier 62 may be generally defined by an elongated body 68 that includes a top portion 70 and a bottom portion 72. One or more knobs 74 may be operably coupled with the top portion 70 (or any other portion) of the blade carrier 62. In some instances, the knobs 74 may extend outwardly from two opposing side portions of the blade carrier 62. The knobs 74 may be used for transporting the blade carrier 62.

An upper portion of a first blade 64A may be positioned along the bottom portion 72 of the blade carrier 62 with a lower portion of the first blade 64A extending downwardly of the blade carrier 62. The lower portion of the first blade 64A is configured to contact and/or interact with the disposed powder material 32. A spacer 76 may be positioned along the upper portion of the blade on an opposing side of the first blade 64A from the blade carrier 62. An upper portion of a second blade 64B may be positioned along the spacer 76 with a lower portion of the second blade 64B also extending downwardly of the blade carrier 62. In some instances, the first and second blades 64A, 64B may extend a generally common distance d downwardly of the blade carrier 62. Alternatively, in some instances, the first blade 64A may extend a first distance downwardly of the blade carrier 62 and the second blade 64B may extend a second distance downwardly of the blade carrier 62. It will be appreciated, however, that the one or more blades 64 may be integrally formed with the blade carrier 62 or the recoater 30 may be free of a blade carrier 62 such that the retainer 66 engages the one or more blades 64 rather than the blade carrier 62.

In some instances, a tightening plate 78 extends along the upper portion of the second blade 64B on an opposing side of the second blade 64B from the spacer 76. One or more fasteners 80 may be operably coupled with each of the tightening plate 78, the second blade 64B, the spacer 76, the first blade 64A, and/or the blade carrier 62 to retain each component in a generally fixed position relative to one another. In some embodiments, such as those illustrated in FIGS. 4 and 5, the fasteners 80 may be configured as a plurality of bolts that are positioned within voids defined by each of the tightening plate 78, the second blade 64B, the spacer 76, the first blade 64A, and/or the blade carrier 62.

The lower portion of each of the first and second blades 64A, 64B may be rigid or flexible and generally aid in the distribution of powder material 32. In some instances, such as the embodiment illustrated in FIGS. 4 and 5, each of the first and second blades 64A, 64B is configured as a comb defining a plurality of teeth 82 in the lower portion thereof. However, it will be appreciated that each blade may include a doctor blade, a brush, or any other sweeping device.

With further reference to FIGS. 4 and 5, the retainer 66 includes a housing 84 that defines a cavity 86 therethrough. In operation, the top portion 70 of the blade carrier 62 may be positioned within the cavity 86 of the housing 84. In some embodiments, an actuator assembly 88 may be used to retain the blade carrier 62 within the cavity 86. The actuator assembly 88 can include any of one or more various actuating devices, such as, but not limited to, pneumatic actuators, hydraulic actuators, mechanical actuators, electromechanical actuators (e.g., solenoids, magnetic assemblies, motor with locking cams, auto tightening screw), and piezoelectric actuators.

In the embodiments illustrated in FIGS. 4 and 5, the retainer 66 includes a plurality of pneumatic actuators 90 positioned along the housing 84. Each of the pneumatic actuators 90 may include a slide 92 movable between at least a first, released position and a second, extended position. As used herein, the released position may be any position in which an extension of the slide 92 is less than an amount needed to retain the blade carrier 62 in a generally fixed position relative the retainer 66. The extended position may be any position in which an extension of the slide 92 is sufficient to contact the blade carrier 62, which may retain the blade carrier 62 in a generally fixed position relative the retainer 66. When in the released position, the upper portion of the blade retainer 66 may be positioned within and removed from the cavity 86 of the housing 84. In the extended position, the upper portion of the blade retainer 66 may be compressively retained between the slides 92 and the housing 84 on the opposing side of the cavity 86 from the plurality of actuators.

In some embodiments, to effectuate the movement of the slide 92 between at least the released position and the engaged position, the pneumatic actuator 90 may be configured as a double acting pneumatic cylinder with a pressure regulator on the extension side to control the slide pressure. In various embodiments, the pneumatic actuator 90 may include a chamber and a piston operably coupled with the slide 92. The piston is moved when a fluid is provided into the chamber that is present on both ends of the piston. First and second valves may be fluidly coupled with the chamber that allow for the fluid to be selectively provided to either side of the piston causing the piston to move in response. The first and second valves may also have flow control features that allow for the adjustment of the speed and distance at which the slide 92 advances and retracts.

In various examples, the actuator 152 may be operably coupled with a control assembly 94 capable of providing a vacuum/suction and/or pushing a fluid, such as air or a process gas (e.g., nitrogen or argon), that causes the slide 92 to move between retracted and engaged positions. For example, the control assembly 94 may provide a pressurized fluid source from a compressor and/or a blower. The control assembly 94 may additionally or alternatively include any other assembly capable of altering a pressure, such as a venturi vacuum pump. In some embodiments, one or more valves and/or switches may be coupled with the control assembly 94 for varying the states of the pneumatic actuator 90.

The control assembly 94 may be operably coupled with a computing system 96. The computing system 96 in FIGS. 4 and 5 is a generalized representation of the hardware and software that may be implemented to control the operation of the apparatus 10 and the various parts of the apparatus 10 described herein. The computing system 96 may be embodied, for example, by software running on one or more processors embodied in one or more devices such as a programmable logic controller ("PLC") or a microcomputer. Such processors may be coupled to process sensors and operating components, for example, through wired or wireless connections. The same processor or processors may be used to retrieve and analyze sensor data, for statistical analysis, and for feedback control. Numerous aspects of the apparatus 10 may be subject to closed-loop control.

Figure 6:
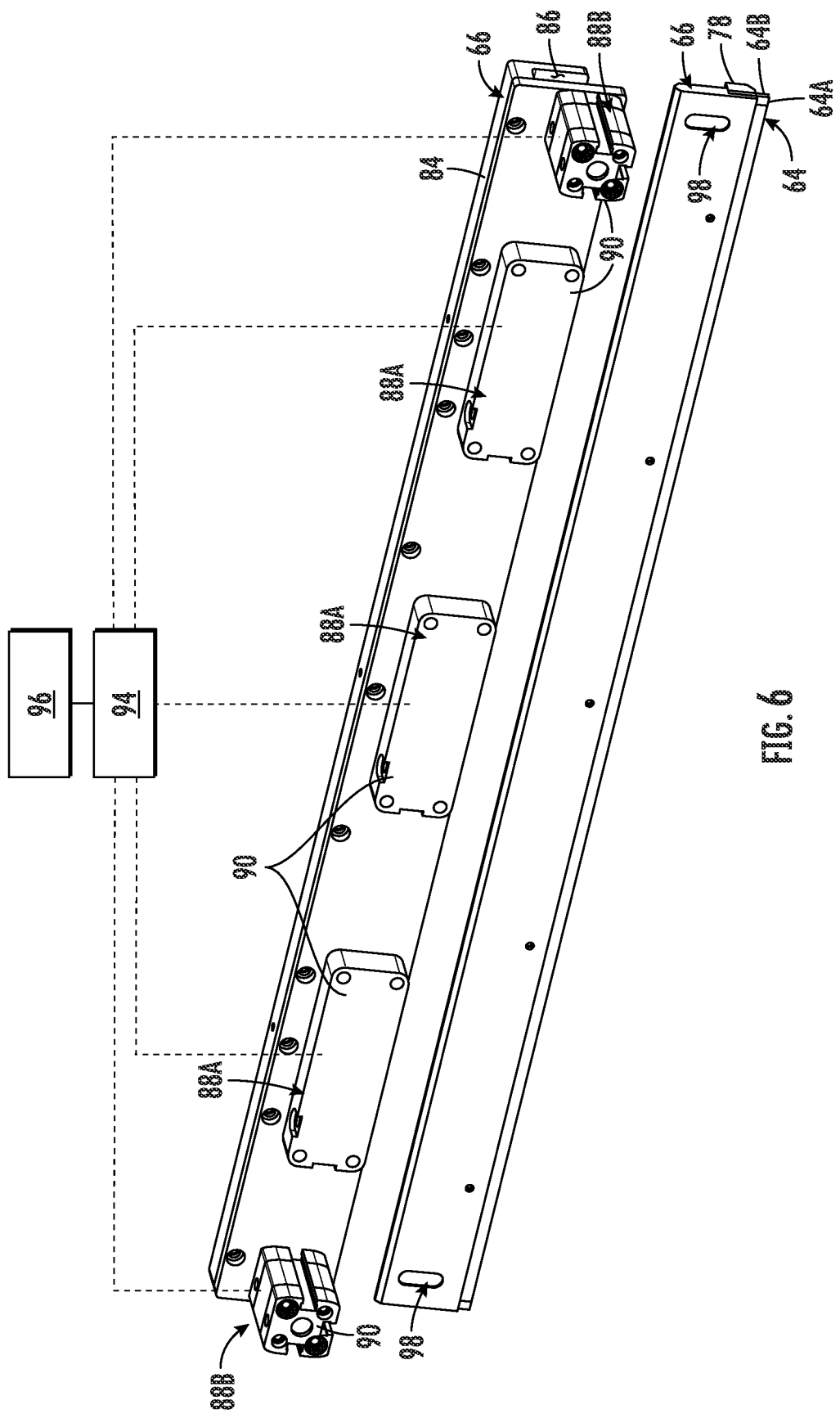
FIG. 6 is a rear exploded view of the blade carrier and the retainer with the retainer having first and second sets of actuators in accordance with various aspects of the present disclosure.
Figure 7:
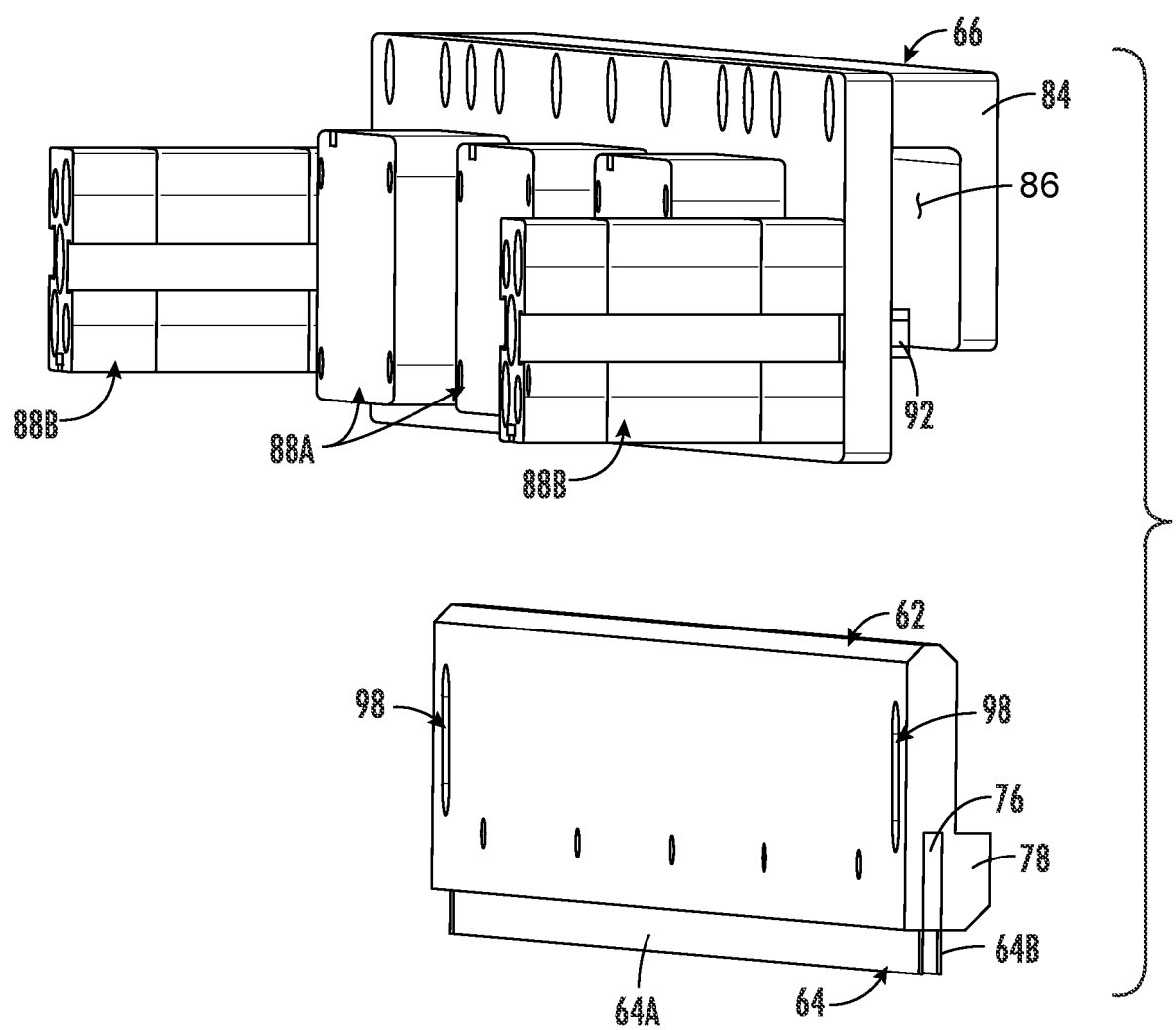
FIG. 7 is a side exploded view of the blade carrier and the retainer with the retainer having the first and second sets of actuators in accordance with various aspects of the present disclosure.

FIGS. 6 and 7 illustrate front and rear exploded views of the blade carrier 62 and the retainer 66 according to various embodiments of the present disclosure. In the illustrated embodiments, the blade carrier 62 includes both a first set of actuators 88A and a second set of actuators 88B, with each set of actuators including one or more actuating devices (e.g., a pneumatic actuator 90). Each of the actuating devices may be configured as a pneumatic actuator 90. Additionally or alternatively, each of the actuating devices may be configured as a hydraulic actuator, mechanical actuator, electromechanical actuator, and piezoelectric actuator.

In some embodiments, both (or either) of the first set of actuators 88A and the second set of actuators 88B may be used to retain the blade carrier 62 within the cavity 86 and actuated between retracted and extended positions by the control assembly 94. In some instances, the slide 92 of the first set of actuators 88A may be positioned in a released default position while the slide 92 of the second set of actuators 88B may be positioned in an extended default position when power is removed from the control assembly 94. As such, if there is a failure of the control assembly 94, the blade carrier 62 may continue to be retained within the retainer 66 thereby preventing damage to the object 18 during a building process.

In the illustrated embodiments of FIGS. 6 and 7, the upper portion of the blade retainer 66 may define one or more channels 98. In operation, the slides 92 of the actuators of the second set of actuators 88B may be respectively positioned within the channels 98. With the slides 92 positioned within the channels 98, the blade carrier 62 may be adjustably coupled to the blade carrier 62 with the length of geometry of the channels 98 defining the range of movement of the blade carrier 62 relative to the retainer 66. As such, with the slides 92 of the second set of actuators 88B positioned within the cavities of the retainer 66, the blade carrier 62 may be slidably retained relative to the retainer 66. Once the blade carrier 62 is positioned in a defined position relative to the retainer 66, the first set of actuators 88A may selectively compress the retainer 66 thereby fixing the position of the blade carrier 62 relative to the retainer 66. Accordingly, in various embodiments, the first set of actuators 88A may extend a first distance and/or apply a first amount of pressure to the blade carrier 62 while the second set of actuators 88B may extend a second distance and/or apply a second amount of pressure to the blade carrier 62. In some embodiments, the first distance is greater than the second distance and/or the first pressure is greater than the second pressure. Additionally or alternatively, in some embodiments, the first distance is less than the second distance and/or the first pressure is less than the second pressure. Additionally or alternatively, the first distance may be generally equal to the second distance and/or the first pressure may be generally equal to the second pressure.

Figure 8:
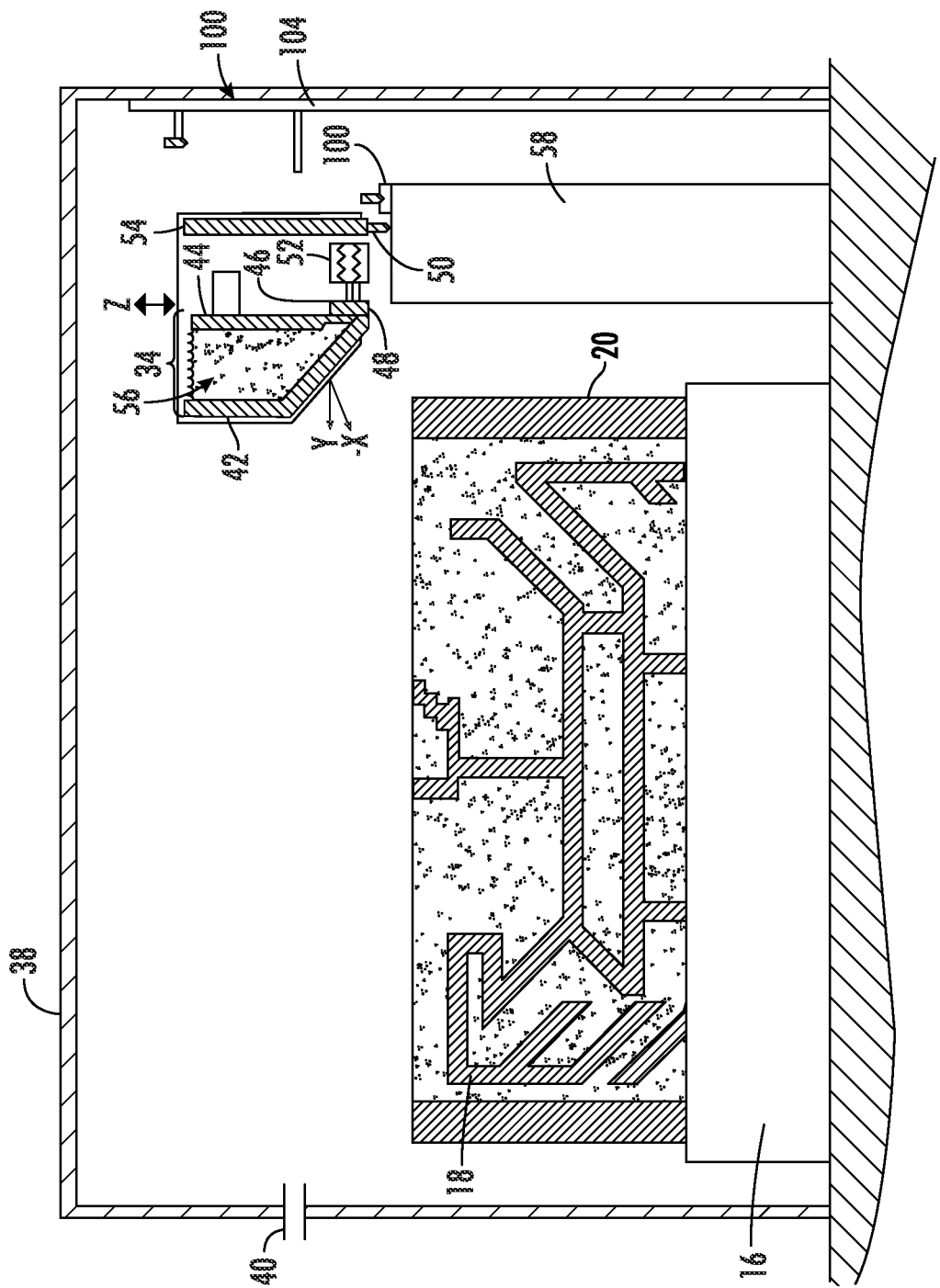
FIG. 8 is a schematic view of the apparatus having a base and a fixture in accordance with various aspects of the present disclosure.
Figure 9:
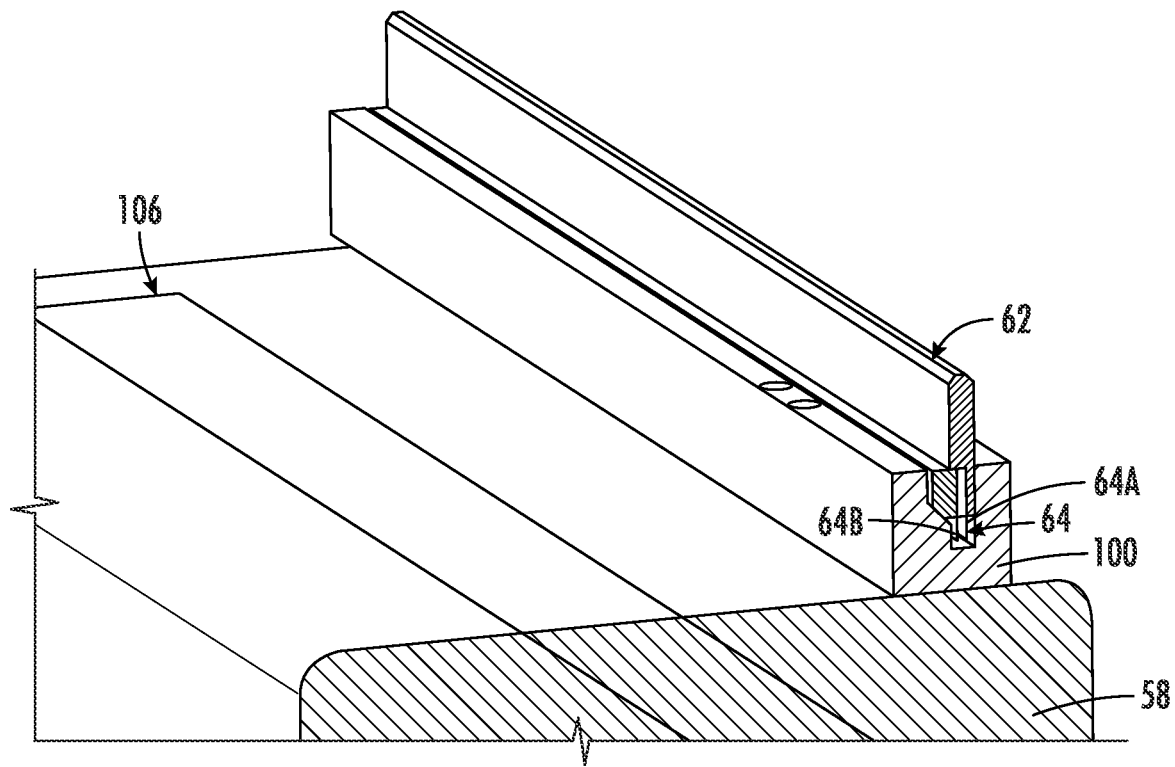
FIG. 9 is a front perspective view of the base and a retainer for maintaining the blade carrier on the base in accordance with various aspects of the present disclosure.

Referring to FIGS. 8 and 9, a schematic view of the recoater 30 positioned over a base 58 and a perspective view of the base 58 are respectively illustrated. In operation, the one or more blades 64 of the recoater 30 may be adjusted and/or replaced at the initiation of the build process and/or between various passes along the object 18 and/or the powder bed 60. For example, the blades 64 of the recoater 30 may be changed due to damage thereto, a change in the type of build material, such as organic or inorganic powders, binders, and/or resins being used, and/or for any other reason. As such, the apparatus 10 may include a fixture 100 that defines retention positions for one or more blade carriers 62 when the blade carrier 62 is separated from the retainer 66 in a position vertically above the base 58. For example, the fixture 100 may include a bracket 104 that define a pair of retention positions that are configured to maintain first and second blade carriers 62 thereon. It will be appreciated, however, that the fixture 100 may include any number of blade carriers 62 of any configuration without departing from the scope of the present disclosure. Moreover, the retention positions may be vertically offset and/or aligned in any other manner without departing from the scope of the present disclosure. For example, in some instances, each of the fixtures 100 may be generally aligned along the base 58 rather than vertically offset above the base 58.

In some instances, once a blade carrier 62 is operably coupled with the recoater 30, the recoater 30 may positioned the blade carrier 62 along a leveling surface 106, which may be a defined location on the base 58. With the blade carrier 62 generally released, the one or more blades 64 may rest on the base 58. Once the lower portion of the blades 64 are positioned along the leveling surface 106, the one or more actuators may be extended thereby generally fixing the position of the blade carrier 62 relative to the retainer 66 in a substantially level orientation. In various embodiments, the base 58 may be formed at least partially from a material that maintains a predefined structural integrity for periods of time, with little to no warping. For instance, the base 58 may be at least partially formed from a precision granite block, a metallic material, and/or any other practicable material.

Figure 10:
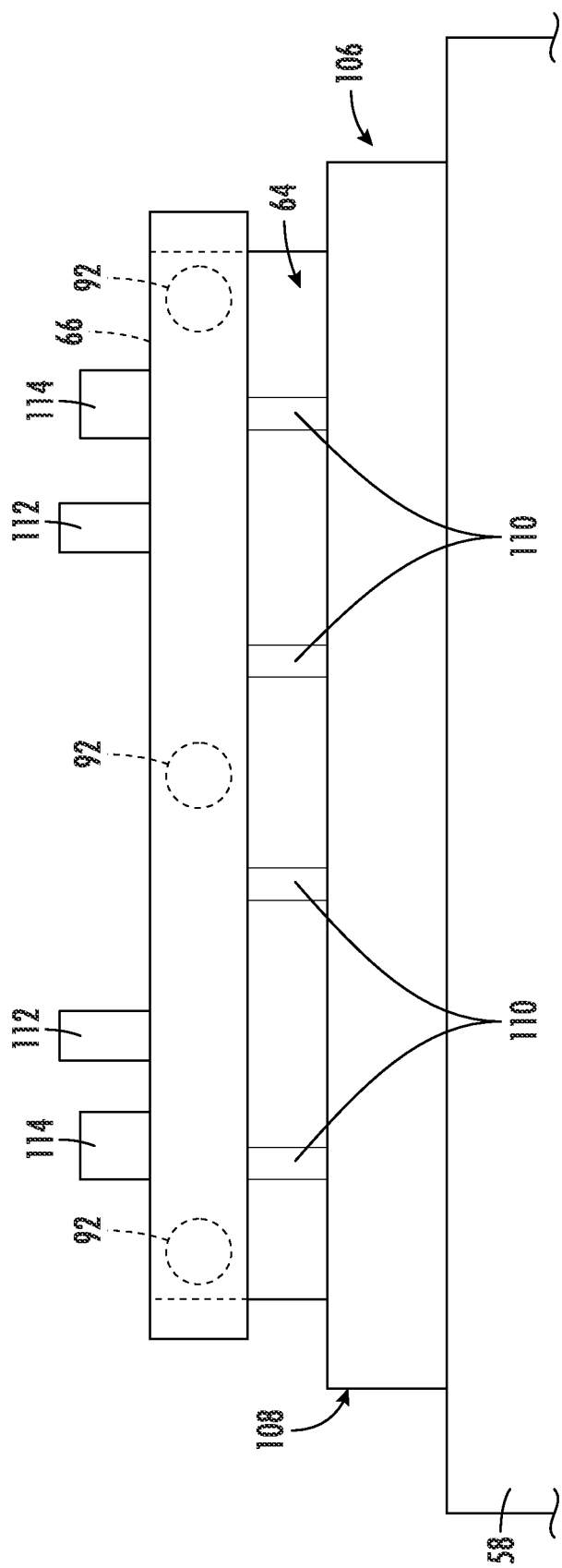
FIG. 10 is a front schematic view of a leveling jig that may be used to orient the retainer relative to the blade carrier in accordance with various aspects of the present disclosure.
Figure 11:
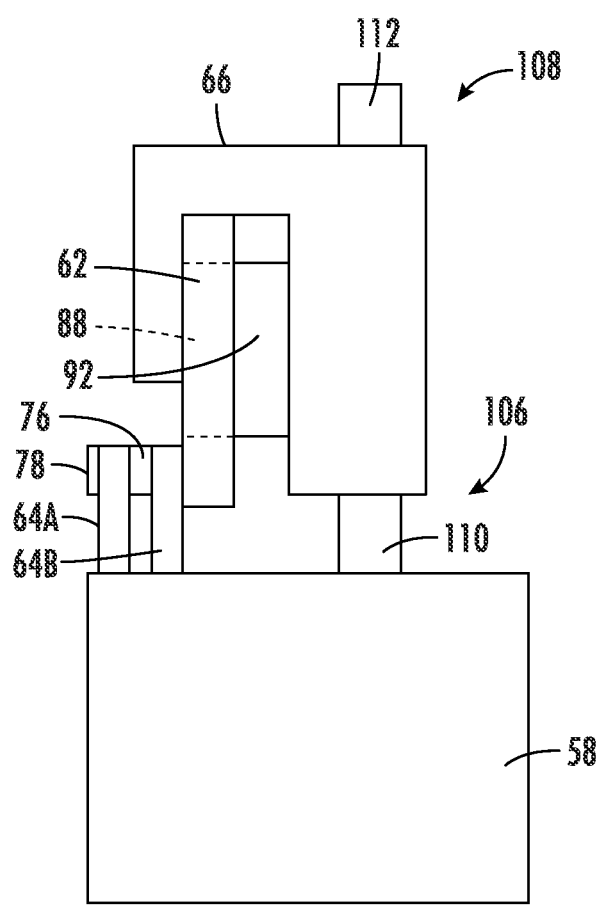
FIG. 11 is a side schematic view of a leveling jig that may be used to orient the retainer relative to the blade carrier in accordance with various aspects of the present disclosure.

Referring to FIGS. 10 and 11, a front view and a side view of a leveling jig 108 that may be positioned within the leveling surfaces 106 are exemplary illustrated. The leveling jig 108 may be used in conjunction with and/or in lieu of leveling the blade carrier 62 along the leveling surface 106. The leveling jig 108 may be operably coupled with the base 58 and be configured to define a retainer height relative to the leveling surface 106 of the base 58. The leveling jig 108 may further be configured to support the blade carrier 62 with the actuator assembly 88 in a released position.

As illustrated, the leveling jig 108 may include a guide pin 110 that extends from the base 58. In some instances, the retainer 66 may be positioned on the guide pin 110. As such, when the blade carrier 62 is released from the retainer 66, the one or more blades 64 of the blade carrier 62 may be positioned on the base 58 while the retainer 66 is positioned on the guide pins 110 thereby offsetting the blades 64 from the retainer 66 by a predefined length.

In some embodiments, a fine level adjustment assembly 112 may be positioned within the retainer 66. The fine level adjustment assembly 112 may be configured as one or more leveling screws that allow for minute adjustments of the retainer 66 relative to the leveling surface 106 of the base 58.

In some instances, the retainer 66 may further include a position sensor 114 that is configured to detect a position and/or an orientation of the retainer 66. In various examples, the position sensor 114 may be configured as an accelerometer that may correspond to one or more multi-axis accelerometers (e.g., one or more two-axis or three-axis accelerometers) such that the accelerometer may be configured to monitor the position of the retainer 66 and/or the recoater 30 in multiple directions, such as by sensing the movement of the retainer 66 along three different axes. It will be appreciated, however, that the position sensor 114 may generally correspond to any suitable type of sensor that may detect a position of the retainer 66 and/or the recoater 30 within the apparatus 10 without departing from the teachings provided herein. For example, the position sensor 114 may be configured as any type of sensor, such as an ultrasonic sensor, a radio detection and ranging (RADAR) sensor, a sound navigation and ranging (SONAR) sensor, a light detection and ranging (LIDAR) sensor, a vision-based sensor, and/or any other practicable sensor. Once a position of the retainer 66 relative to the blade carrier 62 is defined and detected by the sensor, the recoater positioning system 144 (FIG. 16) may move the retainer 66 to the defined position each time the blade carrier 62 is releveled within the leveling jig 108 and/or the leveling surface 106. As such, the blade carrier 62 may be repeatedly released from the retainer 66 and returned to a common location within the retainer 66 to improve consistency of the recoater 30 during operation of the manufacturing apparatus 10.

Figure 12:
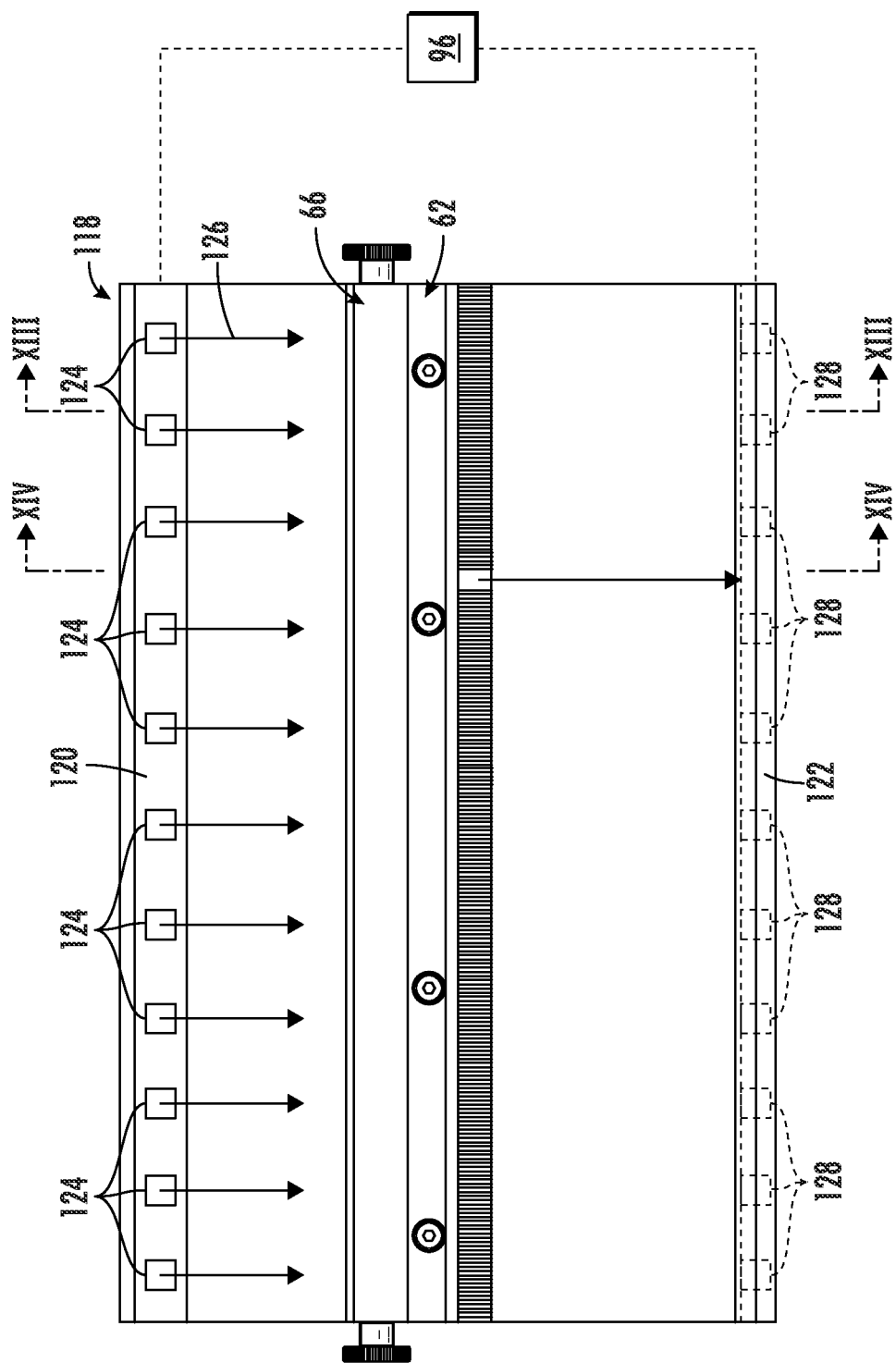
FIG. 12 is a front perspective view of a verification sensor operably coupled with the base in accordance with various aspects of the present disclosure.
Figure 13:
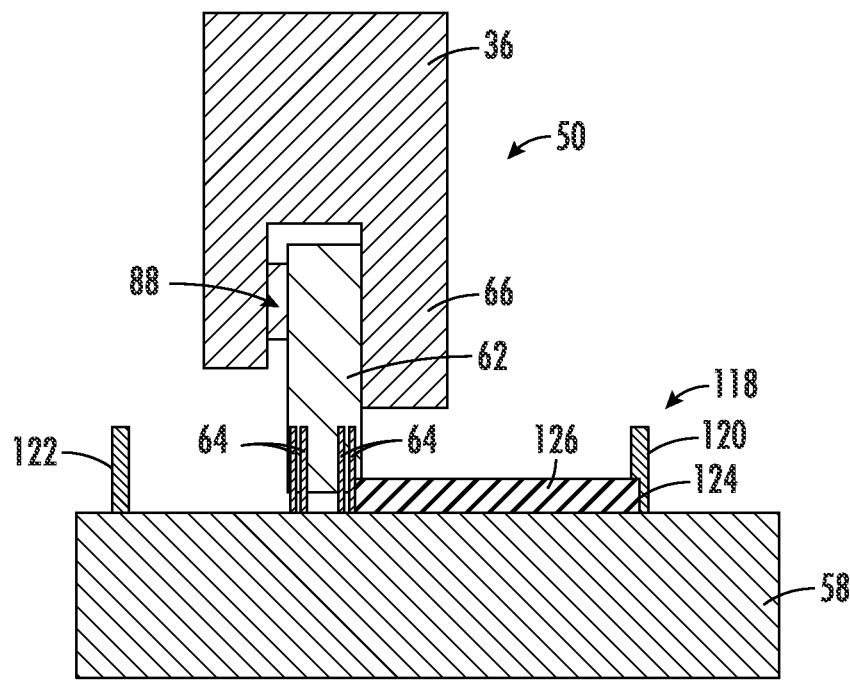
FIG. 13 is a cross-sectional view of the distribution assembly, the verification sensor, and the base taken along the line XIII-XIII of FIG. 12.
Figure 14:
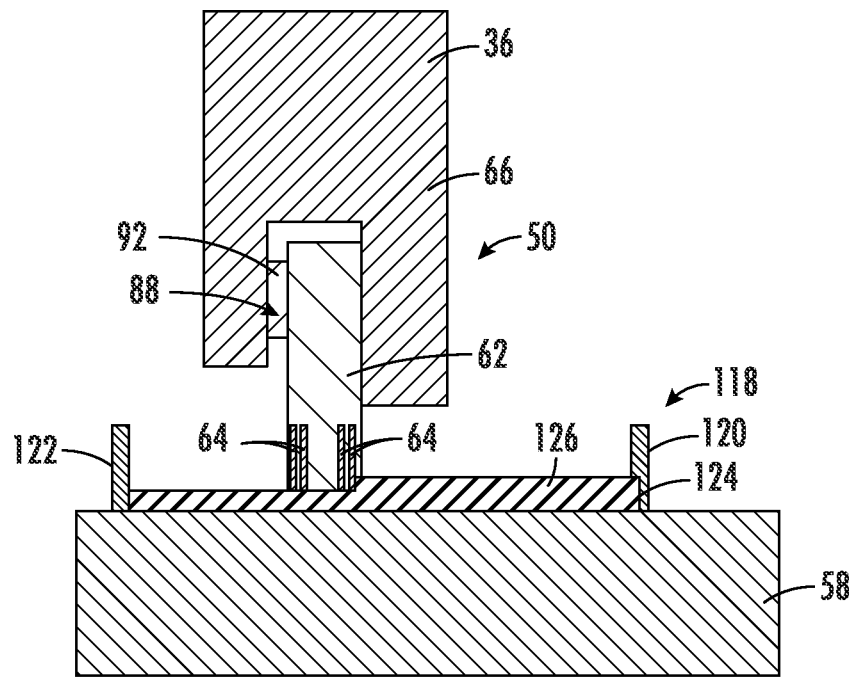
FIG. 14 is a cross-sectional view of the distribution assembly, the verification sensor, and the base taken along the line XIV-XIV of FIG. 12.

In addition to aligning the one or more blades 64 of the blade carrier 62, the base 58 may additionally or alternatively include one or more verification sensors 118. The verification sensors 118 may be configured to detect damage to one or more blades 64 of the recoater 30. The damage to the one or more blades 64 may lead to an inconsistent thickness of build material along the object 18, which, in turn, can cause defects to the object 18 and possible failure of a build operation. FIGS. 12-14 illustrate an exemplary embodiment in which the apparatus 10 includes a verification sensor 118 capable of detecting a change in the profile of a blade of the blade carrier 62. More specifically, FIG. 12 provides a front perspective view of a damaged blade, FIG. 13 illustrates a schematic cross-section of the blade carrier 62 and the verification sensor 118 taken along the line XIII-XIII of FIG. 12, and FIG. 14 illustrates a schematic cross-section of the blade carrier 62 and the verification sensor 118 taken along the line XIV-XIV of FIG. 12.

As illustrated, the verification sensor 118 can include an emitter unit 120 and a receiver unit 122. The emitter unit 120 can include one or more emitter elements 124. Each of the emitter elements 124 is configured to emit a beam 126 toward a corresponding receiver element 128 of the receiver unit 122. Each receiver element 128 is configured to detect presence or absence of the beam 126 emitted by its corresponding emitter element 124. Each of the emitter unit 120 and the receiver unit 122 are operably coupled with the computing system 96 of the apparatus 10. It will be appreciated, however, that the verification sensor 118 may generally correspond to any suitable type of sensor that may detect damage to the one or more blades 64 without departing from the teachings provided herein. For example, the verification sensor 118 may be configured as any type of sensor, such as an ultrasonic sensor, a radio detection and ranging (RADAR) sensor, a sound navigation and ranging (SONAR) sensor, a light detection and ranging (LIDAR) sensor, a vision-based sensor, and/or any other practicable sensor.

In operation, as illustrated in FIG. 13, when the blade is positioned between the emitter unit 120 and the receiver unit 122, the blade substantially blocks the emitted beam 126, preventing the corresponding receiver elements 128 from receiving the beams 126. Upon detecting the loss of the beam 126 at each of the receiver elements 128, the receiver unit 122 may provide an output signal to indicate that the blade is undamaged. As illustrated in FIG. 14, if a portion of the beam 126 is received by the receiver unit 122 and exceeds a threshold amount, the receiver unit 122 may provide an output signal to indicate that the blade is damaged. Once it is determined that the blade is damaged, the recoater 30 may replace the blade carrier 62 with an additional blade carrier 62 positioned within the apparatus 10 with or without human intervention.

Figure 15:
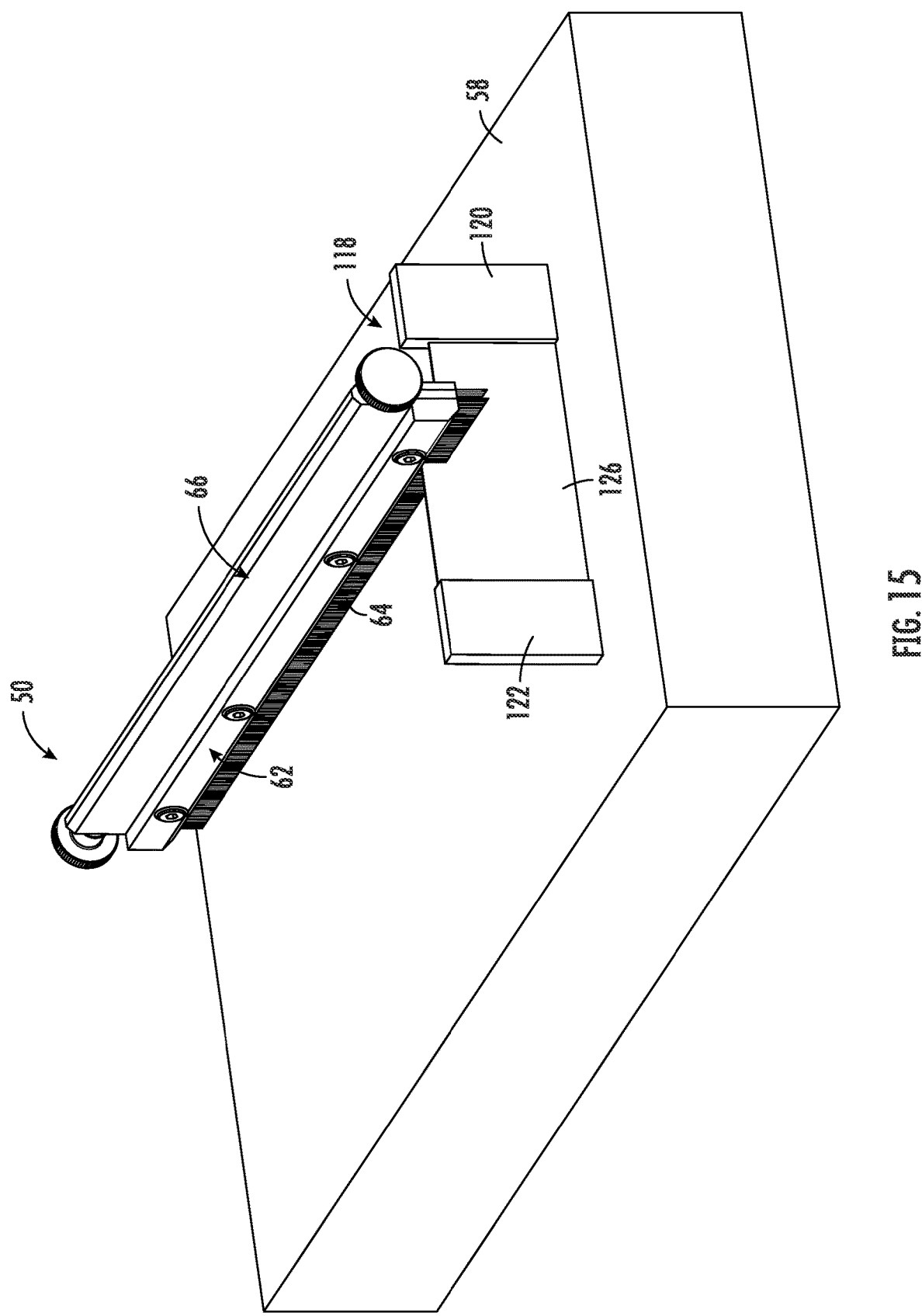
FIG. 15 is a front perspective view of the verification sensor operably coupled with the base in accordance with various aspects of the present disclosure.

With reference to FIG. 15, in some embodiments, the verification sensor 118 may emit a beam 126 having a width that is less than the width of the one or more blades 64. As such, the positioning system 144 (FIG. 16) may move the blade through the beam 126 in a direction that is generally perpendicular to the beam 126. In some instances, the verification sensor 118 may be configured as an optical micrometer that verifies that the one or more blades 64 are level and/or undamaged. Moreover, during the build process, the positioning system 144 may move the blade through the beam 126 periodically to verify that the one or more blades 64 is still level and undamaged.

FIG. 16 depicts certain components of computing system 96 according to example embodiments of the present disclosure. The computing system 96 can include one or more computing device(s) 132 which may be used to implement the method 200 such as described herein. The computing device(s) 132 can include one or more processor(s) 134 and one or more memory device(s) 136. The one or more processor(s) 134 can include any suitable processing device, such as a microprocessor, microcontroller, integrated circuit, an application specific integrated circuit (ASIC), a digital signal processor (DSP), a field-programmable gate array (FPGA), logic device, one or more central processing units (CPUs), graphics processing units (GPUs) (e.g., dedicated to efficiently rendering images), processing units performing other specialized calculations, etc. The memory device(s) 136 can include one or more non-transitory computer-readable storage medium(s), such as RAM, ROM, EEPROM, EPROM, flash memory devices, magnetic disks, etc., and/or combinations thereof.

Figure 17:
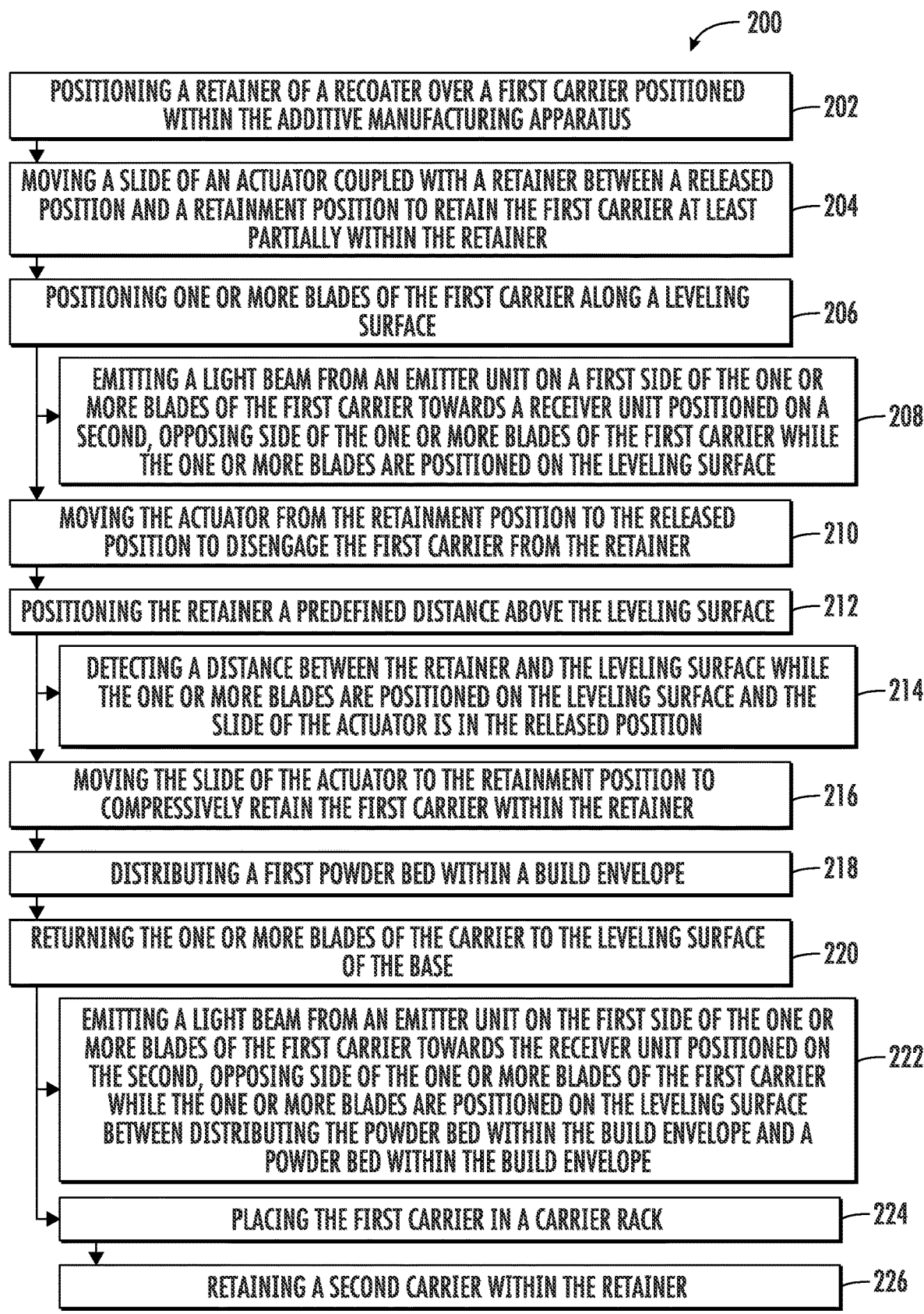
FIG. 17 illustrates a method of operating the additive manufacturing apparatus having the distribution assembly in accordance with various aspects of the present disclosure.

The memory device(s) 136 can include one or more computer-readable media and can store information accessible by the one or more processor(s) 134, including instructions 138 that can be executed by the one or more processor (s) 134. The instructions 138 may include one or more steps of the method 200 described below in reference to FIG. 17, such as to execute operations of the recoater 30 of the additive manufacturing apparatus 10 described herein. For instance, the memory device(s) 136 can store instructions 138 for running one or more software applications, displaying a user interface, receiving user input, processing user input, etc. In some implementations, the instructions 138 can be executed by the one or more processor(s) 134 to cause the one or more processor(s) 134 to perform operations, e.g., such as one or more portions of methods described herein. The instructions 138 can be software written in any suitable programming language or can be implemented in hardware.

Additionally, and/or alternatively, the instructions 138 can be executed in logically and/or virtually separate threads on processor(s) 134.

The one or more memory device(s) 136 can also store data 140 that can be retrieved, manipulated, created, or stored by the one or more processor(s) 134. The data 140 can include, for instance, data to facilitate performance of the method 200 described herein. The data 140 can be stored in one or more database(s). The one or more database(s) can be connected to computing system 96 by a high bandwidth LAN or WAN or can also be connected to controller through network(s) (not shown). The one or more database(s) can be split up so that they are located in multiple locales. In some implementations, the data 140 can be received from another device.

The computing device(s) 132 can also include a communication module or interface 142 used to communicate with one or more other component(s) of computing system 96 or the additive manufacturing apparatus 10 over the network (s). The communication interface 142 can include any suitable components for interfacing with one or more network(s), including for example, transmitters, receivers, ports, controllers, antennas, or other suitable components. In various embodiments, the communication interface may be operably coupled with the energy device of the apparatus 10, a build unit positioning system 12, a verification sensor 118, the recoater positioning system 144, the actuating element 46 of the recoater 30, the recoater distribution assembly 36, and/or the control assembly 94. However, it will be appreciated that any component described herein may be operably coupled with the computing system 96 and/or include a separate computing system 96 for initiating one or more operating conditions of that respective component.

Now that the construction and configuration of the additive manufacturing apparatus have been described according to various examples of the present subject matter, a method 200 for operating an additive manufacturing apparatus is provided. The method 200 can be used to operate the additive manufacturing apparatus and the recoater, or any other suitable additive manufacturing apparatus having any type and configuration of positioning assembly. It should be appreciated that the example method 200 is discussed herein only to describe example aspects of the present subject matter and is not intended to be limiting.

Referring now to FIG. 15, the method 200, at step 202, includes positioning a retainer of a recoater over a first blade carrier positioned within the additive manufacturing apparatus. In various embodiments, the first blade carrier may be positioned within a fixture within the additive manufacturing apparatus, within a leveling jig, on a base positioned externally of a build envelope, and/or in any other location within the additive manufacturing apparatus.

Next, at step 204, the method includes moving a slide of an actuator coupled with a retainer between a released position and an extended position to retain the first blade carrier at least partially within the retainer. In some instances, the movement of the slide from the released position and the extended position compressively retains the blade carrier within a cavity of the retainer. However, in other examples, the slide may be positioned within a channel, void, or other feature of the blade carrier to releasably couple the blade carrier to the retainer.

Once the blade carrier is coupled with the retainer, at step 206, the method includes positioning one or more blades of the first blade carrier along a leveling surface. The leveling surface may be a portion of a base that may be formed at least partially from a material that maintains structural integrity for periods of time, with little to no warping. For instance, the base may be at least partially formed from a precision granite block, a metallic material, and/or any other practicable material.

With the one or more blades of the blade carrier positioned along the leveling surface, the method, at step 208, can include emitting a beam from an emitter unit on a first side of the one or more blades of the first blade carrier towards a receiver unit positioned on a second, opposing side of the one or more blades of the first blade carrier while the one or more blades are positioned on the leveling surface. When the blade is positioned between the emitter unit and the receiver unit during normal operation, the blade substantially blocks the emitted beam, preventing the corresponding receiver elements from receiving the beams. Upon detecting the loss of the beam at each of the receiver elements, the receiver unit may provide an output signal to indicate that the blade is undamaged. If a portion of the beam is received by the receiver unit and the amount of light exceeds a threshold amount, the receiver unit may provide an output signal to indicate that the blade is damaged. Once it is determined that the blade is damaged, the recoater may replace the blade carrier with an additional blade carrier positioned within the apparatus with or without human intervention.

With the blade positioned on the leveling surface of the base, at step 210, the method can include moving the actuator from the extended position to the released position to disengage the first blade carrier from the retainer. With the blade carrier generally released from the retainer, the method, at step 212, can include positioning the retainer a predefined distance above the leveling surface. In various embodiments, a leveling jig may be used to retain the blade carrier in a generally predefined position. Additionally or alternatively, an upper portion of the blade carrier may be generally positioned within the cavity of the retainer with the one or more blades of the blade carrier resting on the leveling surface.

As the position of the retainer is varied relative to the blade carrier, the method, at step 214, can include detecting a distance between the retainer and the leveling surface while the one or more blades are positioned on the leveling surface and the slide of the actuator is in the released position.

Once the retainer is positioned in a predefined location relative to the blade carrier and/or the leveling surface, the method, at step 216, can include moving the slide of the actuator to the extended position to retain the first blade carrier within the retainer. As provided herein, the movement of the slide from the released position and the extended position can compressively retain the blade carrier within the cavity of the retainer. However, in other examples, the slide may be positioned within a channel, void, or other feature of the blade carrier to releasably couple the blade carrier to the retainer.

With the blade carrier positioned in a predefined orientation relative to the retainer, the method, at step 218, can include distributing a first powder bed of a powder material within a build envelope. The distribution assembly is movable above the object and/or the build plate and is configured to distribute a powder material disposed on an additively manufactured object within the build envelope and/or the build plate to form a powder bed of the powder material. In some embodiments, the distribution assembly distributes the powder material on the surface of the build plate such that the resulting powder bed defines a substantially planar surface. In some embodiments, the distribution assembly is movable above the build plate in a plane parallel to the object and/or the build plate of the build plate.

After the distribution of the first powder bed of a powder material within the build envelope, the method, at step 220, includes returning the one or more blades of the blade carrier to the leveling surface of the base. With the one or more blades on the leveling surface, at step 222, the method includes emitting a beam from the emitter unit on the first side of the one or more blades of the first blade carrier towards a receiver unit positioned on the second, opposing side of the one or more blades of the first blade carrier while the one or more blades are positioned on the leveling surface between distributing the first powder bed of a powder material within the build envelope and a second powder bed of the powder material within the build envelope. When the blade is positioned between the emitter unit and the receiver unit during normal operation, the blade substantially blocks the emitted beam, preventing the corresponding receiver elements from receiving the beams. Upon detecting the loss of the beam at each of the receiver elements, the receiver unit may provide an output signal to indicate that the blade is undamaged. If a portion of the beam is received by the receiver unit and exceeds a threshold amount, the receiver unit may provide an output signal to indicate that the blade is damaged. Once it is determined that the blade is damaged, the recoater may replace the blade carrier with an additional blade carrier positioned within the apparatus with or without human intervention.

In some instances, the method, at step 224, can include placing the first blade carrier in a fixture when one or more blades of the first blade carrier are determined to be damaged and/or the blade carrier is to be changed for any other reason. Once the first blade carrier is released from the retainer, at step 226, the method can include retaining a second blade carrier within the blade carrier. With the second blade carrier, one or more new blades may be used during continuation of the build process and/or for the start of a new build process. In some instances, the second blade carrier may include one or more blades of a different geometry and/or material than the one or more blades of the first blade carrier.

It should be appreciated that the additive manufacturing apparatus is described herein only for the purpose of explaining aspects of the present subject matter. In other example embodiments, the additive manufacturing apparatus may have any other suitable configuration and may use any other suitable additive manufacturing technology. Further, the additive manufacturing apparatus and processes or methods described herein may be used for forming components using any suitable build material. For example, the material may be plastic, metal, concrete, ceramic, polymer, epoxy, photopolymer resin, or any other suitable material that may be embodied in a powder bed of slurry, resin, or any other suitable form of sheet material having any suitable consistency, viscosity, or material properties. For example, according to various embodiments of the present subject matter, the additively manufactured components described herein may be formed in part, in whole, or in some combination of materials including but not limited to pure metals, nickel alloys, chrome alloys, titanium, titanium alloys, magnesium, magnesium alloys, aluminum, aluminum alloys, iron, iron alloys, stainless steel, and nickel or cobalt based superalloys (e.g., those available under the name Inconel® available from Special Metals Corporation). These materials are examples of materials suitable for use in the additive manufacturing processes described herein and may be generally referred to as "additive materials."

Aspects of the invention(s) are provided by the subject matter of the following clauses, which are intended to cover all suitable combinations unless dictated otherwise based on logic or the context of the clauses and/or associated figures and description:

A recoater for an additive manufacturing apparatus comprising a recoater arm; a retainer operably coupled with the recoater arm, the retainer including a housing defining a cavity; a blade carrier supporting one or more blades; and a first actuator operably coupled with the housing and configured to compressively retain an upper portion of the blade carrier within the cavity between a first slide of the first actuator and the housing.

The recoater for an additive manufacturing apparatus of one or more of these clauses, wherein the first actuator is pneumatically translated between a released position and an extended position.

The recoater for an additive manufacturing apparatus of one or more of these clauses, further comprising a second actuator operably coupled with the housing and configured to selectively retain the blade carrier within the cavity, wherein the second actuator includes a second slide that is configured to be positioned within a channel defined by the upper portion of the blade carrier.

The recoater for an additive manufacturing apparatus of one or more of these clauses, further comprising a control assembly operably coupled with the first actuator and the second actuator and configured to move each of the first slide and the second slide between respective released and extended positions.

The recoater for an additive manufacturing apparatus of one or more of these clauses, wherein the first slide of the first actuator is positioned in the released position and the second slide of the second actuator is positioned in the extended position when power is removed from the control assembly.

The recoater for an additive manufacturing apparatus of one or more of these clauses, further comprising a positioning system operably coupled with the recoater and configured to move the recoater between a build envelope and a base, the base configured to retain the blade carrier in a predefined location when released from the retainer.

The recoater for an additive manufacturing apparatus of one or more of these clauses, further comprising a fixture configured to retain the blade carrier when the blade carrier is separated from the retainer in a position vertically above the base.

The recoater for an additive manufacturing apparatus of one or more of these clauses, further comprising a leveling jig operably coupled with a base and configured to define a retainer height relative to a leveling surface of the base, the leveling jig further configured to support the blade carrier with the first actuator in a released position.

The recoater for an additive manufacturing apparatus of one or more of these clauses, further comprising a verification sensor positioned externally of the build envelope and including an emitter unit and a receiver unit, the emitter unit configured to direct a beam towards the receiver unit, and wherein the one or more blades of the blade carrier are positioned between the emitter unit and the receiver unit.

An additive manufacturing apparatus comprising a build plate configured to support an object, the build plate positioned within a build envelope; a base positioned externally of the build envelope; a build unit including an energy device and a recoater; a distribution assembly operably coupled with the recoater, the distribution assembly including a retainer having a housing that defines a cavity, a blade carrier supporting one or more blades, and an actuator selectively retaining the blade carrier within the cavity; and a positioning system operably coupled with the recoater and configured to move the recoater between the build envelope and the base, wherein the actuator is configured to release the blade carrier when the blade carrier is disposed externally from the build envelope.

The additive manufacturing apparatus of one or more of these clauses, wherein the base includes a leveling surface, and wherein the blade carrier is configured to be released from the retainer when the one or more blades of the blade carrier are positioned on the leveling surface.

The additive manufacturing apparatus of one or more of these clauses, further comprising a verification sensor positioned on the base and including an emitter unit and a receiver unit, the emitter unit configured to direct a beam towards the receiver unit, and wherein the one or more blades of the blade carrier are positioned between the emitter unit and the receiver unit.

The additive manufacturing apparatus of one or more of these clauses, further comprising a fixture supporting a second blade carrier, wherein the positioning system is configured to move the retainer between the build envelope, the base, and the fixture.

The additive manufacturing apparatus of one or more of these clauses, further comprising a retainer sensor operably coupled with the retainer and configured to store a predefined position of the retainer relative to the base, wherein the actuator is released when the retainer is offset from the predefined position and extended when the retainer is positioned in the predefined position.

A method of operating an additive manufacturing apparatus that includes a recoater, the method comprising positioning a retainer of a recoater over a first blade carrier positioned within the additive manufacturing apparatus; moving a slide of an actuator coupled with a retainer between a released position and an extended position to retain the first blade carrier at least partially within the retainer; positioning one or more blades of the first blade carrier along a leveling surface; moving the actuator from the extended position to disengage the first blade carrier from the retainer; positioning the retainer, a predefined distance above the leveling surface; moving the slide of the actuator to the extended position to compressively retain the first blade carrier within the retainer; and distributing a first powder bed of a powder material within a build envelope.

The method of one or more of these clauses, further comprising detecting a distance between the retainer and the leveling surface while the one or more blades are positioned on the leveling surface and the slide of the actuator is in the released position.

The method of one or more of these clauses, further comprising emitting a beam from an emitter unit on a first side of the one or more blades of the first blade carrier towards a receiver unit positioned on a second, opposing side of the one or more blades of the first blade carrier while the one or more blades are positioned on the leveling surface.

The method of one or more of these clauses, further comprising emitting a beam from an emitter unit on a first side of the one or more blades of the first blade carrier towards a receiver unit positioned on a second, opposing side of the one or more blades of the first blade carrier while the one or more blades are positioned on the leveling surface between distributing the first powder bed of a powder material within a build envelope and a second powder bed of the powder material within a build envelope.

The method of one or more of these clauses, further comprising placing the first blade carrier in a fixture; and retaining a second blade carrier within the retainer.

The method of one or more of these clauses, wherein the actuator is configured as a pneumatic actuator.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A recoater for an additive manufacturing apparatus comprising:
   a recoater arm;
   a retainer operably coupled with the recoater arm, the retainer including a housing defining a cavity;
   a blade carrier supporting one or more blades;
   a first actuator operably coupled with the housing and configured to compressively retain an upper portion of the blade carrier within the cavity between a first slide of the first actuator and the housing; and
   a second actuator operably coupled with the housing and configured to selectively retain the blade carrier within the cavity, wherein the second actuator includes a second slide that is configured to be positioned within a channel defined by the upper portion of the blade carrier.

2. The recoater for the additive manufacturing apparatus of claim 1, wherein the first actuator is pneumatically translated between a released position and an extended position.

3. The recoater for the additive manufacturing apparatus of claim 1, further comprising:
   a control assembly operably coupled with the first actuator and the second actuator and configured to move each of the first slide and the second slide between respective released and extended positions.

4. The recoater for the additive manufacturing apparatus of claim 3, wherein the first slide of the first actuator is positioned in the released position and the second slide of the second actuator is positioned in the extended position when power is removed from the control assembly.

5. The recoater for the additive manufacturing apparatus of claim 1, further comprising:
   a positioning system operably coupled with the recoater and configured to move the recoater between a build envelope and a base, the base configured to retain the blade carrier in a predefined location when released from the retainer.

6. The recoater for the additive manufacturing apparatus of claim 5, further comprising:
   a fixture configured to retain the blade carrier when the blade carrier is separated from the retainer in a position vertically above the base.

7. The recoater for the additive manufacturing apparatus of claim 1, further comprising:
   a leveling jig operably coupled with a base and configured to define a retainer height relative to a leveling surface of the base, the leveling jig further configured to support the blade carrier with the first actuator in a released position.

8. The recoater for the additive manufacturing apparatus of claim 5, further comprising:
   a verification sensor positioned externally of the build envelope and including an emitter unit and a receiver unit, the emitter unit configured to direct a beam towards the receiver unit, and wherein the one or more blades of the blade carrier are positioned between the emitter unit and the receiver unit.

9. A recoater for an additive manufacturing apparatus comprising:
   a recoater arm;
   a powder delivery system configured to move with the recoater arm and configured to dispose a material;
   a retainer operably coupled with the recoater arm, the retainer including a housing defining a cavity;
   a blade carrier supporting one or more blades;
   a first actuator operably coupled with the housing and configured to compressively retain an upper portion of the blade carrier within the cavity between a first slide of the first actuator and the housing; and
   a second actuator operably coupled with the housing and configured to selectively retain the blade carrier within the cavity, wherein the second actuator includes a second slide that is configured to be positioned within a channel defined by the upper portion of the blade carrier.

10. The recoater for the additive manufacturing apparatus of claim 9, wherein the first actuator is pneumatically translated between a released position and an extended position.

11. The recoater for the additive manufacturing apparatus of claim 9, further comprising:
    a control assembly operably coupled with the first actuator and the second actuator and configured to move each of the first slide and the second slide between respective released and extended positions.

12. The recoater for the additive manufacturing apparatus of claim 11, wherein the first slide of the first actuator is positioned in the released position and the second slide of the second actuator is positioned in the extended position when power is removed from the control assembly.

13. The recoater for the additive manufacturing apparatus of claim 9, further comprising:
    a positioning system operably coupled with the recoater and configured to move the recoater between a build envelope and a base, the base configured to retain the blade carrier in a predefined location when released from the retainer.

14. The recoater for the additive manufacturing apparatus of claim 13, further comprising:
    a fixture configured to retain the blade carrier when the blade carrier is separated from the retainer in a position vertically above the base.

15. The recoater for the additive manufacturing apparatus of claim 9, further comprising:
    a leveling jig operably coupled with a base and configured to define a retainer height relative to a leveling surface of the base, the leveling jig further configured to support the blade carrier with the first actuator in a released position.

16. The recoater for the additive manufacturing apparatus of claim 13, further comprising:
    a verification sensor positioned externally of the build envelope and including an emitter unit and a receiver unit, the emitter unit configured to direct a beam towards the receiver unit, and wherein the one or more blades of the blade carrier are positioned between the emitter unit and the receiver unit.

17. A recoater for an additive manufacturing apparatus comprising:
- a recoater arm;
- a retainer operably coupled with the recoater arm, the retainer including a housing defining a cavity;
- a blade carrier supporting one or more blades; and
- a first actuator operably coupled with the housing and configured to compressively retain an upper portion of the blade carrier within the cavity between a slide of the first actuator and the housing wherein the slide is configured to be positioned within a channel defined by the upper portion of the blade carrier;
- a second actuator operably coupled with the housing and configured to selectively retain the blade carrier within the cavity, wherein the second actuator includes a second slide that is configured to be positioned within a channel defined by the upper portion of the blade carrier; and
- a control assembly operably coupled with the first actuator and the second actuator and configured to move each of the first slide and the second slide between respective released and extended positions.

\* \* \* \* \*